(12) United States Patent
Jia et al.

(10) Patent No.: US 11,753,018 B2
(45) Date of Patent: Sep. 12, 2023

(54) LANE-TYPE AND ROADWAY HYPOTHESES DETERMINATIONS IN A ROAD MODEL

(71) Applicant: Aptiv Technologies Limited, St. Michael (BB)

(72) Inventors: Bin Jia, Columbia, MD (US); David A. Schwartz, Moorpark, CA (US)

(73) Assignee: Aptiv Technologies Limited, St. Michael (BB)

( * ) Notice: Subject to any disclaimer, the term of this patent is extended or adjusted under 35 U.S.C. 154(b) by 334 days.

(21) Appl. No.: 17/177,946

(22) Filed: Feb. 17, 2021

(65) Prior Publication Data

US 2022/0258738 A1  Aug. 18, 2022

(51) Int. Cl.
*B60W 40/072* (2012.01)
*B60W 60/00* (2020.01)
(Continued)

(52) U.S. Cl.
CPC .......... *B60W 40/072* (2013.01); *B60W 30/12* (2013.01); *B60W 30/14* (2013.01);
(Continued)

(58) Field of Classification Search
CPC .... B60W 40/072; B60W 30/12; B60W 30/14; B60W 30/18018; B60W 60/001;
(Continued)

(56) References Cited

U.S. PATENT DOCUMENTS

2008/0249706 A1* 10/2008 Bradai ................ B60W 40/072
701/532

2010/0076920 A1* 3/2010 Johnson ................ G01V 11/00
706/52
2017/0016740 A1* 1/2017 Cui ........................ G01C 21/30

FOREIGN PATENT DOCUMENTS

DE 102017207790 A1 11/2018

OTHER PUBLICATIONS

"A High-Level Road Model Information Fusion Framework and its Application to Multi-Lane Speed Limit Inference" M. Schreier et al., 2017 IEEE Intelligent Vehicles Symposium (IV) Jun. 11-14, 2017, Redondo Beach, CA, USA (Year: 2017).*
(Continued)

*Primary Examiner* — Peter D Nolan
*Assistant Examiner* — Tanya C Sienko
(74) *Attorney, Agent, or Firm* — Sawtooth Patent Group PLLC

(57) ABSTRACT

This document describes techniques and systems to make determinations of lane-type and roadway hypotheses in a road model. The road-perception system can fuse various forms of evidence to determine lane-type hypotheses and respective belief masses associated with the lane-type hypotheses. The road-perception system the computes, using the belief masses, a belief parameter and a plausibility parameter associated with the lane-type hypotheses. One or more roadway hypotheses are then determined using the lane-type hypotheses. The road-perception system then uses the respective belief parameter and plausibility parameter associated with the lane-type hypotheses to compute a belief parameter and a plausibility parameter associated with the roadway hypotheses. In this way, the described techniques and systems can provide an accurate and reliable road model with quantified uncertainty.

20 Claims, 10 Drawing Sheets

(51) Int. Cl.
    G06V 20/58    (2022.01)
    G06V 20/56    (2022.01)
    B60W 30/12    (2020.01)
    B60W 30/14    (2006.01)
    B60W 30/18    (2012.01)
(52) U.S. Cl.
    CPC .... B60W 30/18018 (2013.01); B60W 60/001 (2020.02); G06V 20/582 (2022.01); G06V 20/588 (2022.01); B60W 2420/52 (2013.01); B60W 2552/53 (2020.02); B60W 2554/80 (2020.02)
(58) Field of Classification Search
    CPC ......... B60W 2420/52; B60W 2552/53; B60W 2554/80; G06V 20/582; G06V 20/588
    See application file for complete search history.

(56) References Cited

OTHER PUBLICATIONS

"General combination rules for qualitative and quantitative beliefs" by A Martin et al., Manuscript received Sep. 24, 2007; released for publication Aug. 5, 2008.ArXiv date Jan. 28, 2009. downloaded off arXiv:0906.5119v1 (Year: 2009).*
"Constructing and Reasoning about Alternative Frames of Discernment" J. Schubert. Proceedings of the Workshop on the Theory of Belief Functions (Belief 2010), Brest, France, Apr. 1-2, 2010, Paper 24, pp. 1-6. (Year: 2010).*
"Evidential Multisensor Fusion and Erroneous Management of Lanes for Autonomous Driving", S. Moujtahid et al., 2019 IEEE Sensors Applications Symposium (SAS) (pp. 1-6) (Year: 2019).*
"Lane Recognition Based on Location of Raised Pavement Markers", H Yu et al., 2011 IEEE Intelligent Vehicles Symposium (IV) Baden-Baden, Germany, Jun. 5-9, 2011 (Year: 2011).*
Wikipedia article "Menger Curvature", captured off Wayback machine Oct. 1, 2014 (Year: 2014).*
"A General Reliability-Aware Fusion Concept Using DST and Supervised Learning with Its Applications in Multi-Source Road Estimation", T. Nguyen et al., 2018 IEEE Intelligent Vehicles Symposium (IV) (pp. 597-604) (Year: 2018).*
"Efficient Scene Understanding for Intelligent Vehicles Using a Part-Based Road Representation" D. Topfer et al., Proceedings of the 16th International IEEE Annual Conference on Intelligent Transportation Systems (ITSC 2013), The Hague, The Netherlands, Oct. 6-9, 2013 (Year: 2013).*
"Extended European Search Report", EP Application No. 21218427.9, dated Jun. 15, 2022, 10 pages.
Kurdej, et al., "Map-Aided Evidential Grids for Driving Scene Understanding", Apr. 2015, pp. 30-41.
Puthon, et al., "A Complete System to Determine the Speed Limit by Fusing a GIS and a Camera", Oct. 5, 2011, pp. 1686-1691.
Schreier, et al., "A High-Level Road Model Information Fusion Framework and its Application to Multi-Lane Speed Limit Inference", Jun. 2017, pp. 1201-1208.

"Curvature of a 1D curve in a 2D or 3D space—MathWorks", Retrieved at: https://www.mathworks.com/matlabcentral/fileexchange/69452-curvature-of-a-1d-curve-in-a-2d-or-3d-space—on Nov. 10, 2020, 4 pages.
"Dempster-Shafer theory—Wikipedia", Retrieved at: https://en.wikipedia.org/wiki/Dempster-Shafer_theory—On Mar. 24, 2020, 12 pages.
"Menger curvature—Wikipedia", Retrieved at: https://en.wikipedia.org/wiki/Menger_curvature—on Nov. 10, 2020, Nov. 9, 2020, 3 pages.
"United State Pavement Markings", Retrieved at: https://mutcd.fhwa.dot.gov/services/publications/fhwaop02090/uspavementmarkings.pdf—on Nov. 10, 2020, 9 pages.
"United States Road Symbol Signs", Retrieved at: https://mutcd.fhwa.dot.gov/services/publications/fhwaop02084/us_road_symbol_signs.pdf—on Nov. 10, 2020, 9 pages.
Dierkes, et al., "Corridor Selection Under Semantic Uncertainty for Autonomous Road Vehicles", Nov. 2018, pp. 505-512, 8 pages.
Dierkes, et al., "Towards a Multi-Hypothesis Road Representation for Automated Driving", Sep. 2015, 8 pages.
Ganji, et al., "Road Safety Evaluation using a Novel Cross Efficiency Method based on Double Frontiers DEA and Evidential Reasoning Approach", Dec. 2017, 16 pages.
Huang, "Lane Estimation for Autonomous Vehicles using Vision and LIDAR", PhD Thesis, MIT, Feb. 2010, 114 pages.
Mehrannia, et al., "A Dempster-Shafer Sensor Fusion Approach for Traffic Incident Detection and Localization", 21st International Conference on Intelligent Transportation Systems (ITSC), Nov. 2018, pp. 3911-3916, 6 pages.
Moujtahid, et al., "Evidential Multisensor Fusion and Erroneous Management of Lanes for Autonomous Driving", 2019 IEEE Sensors Applications Symposium (SAS), Mar. 2019, 6 pages.
Nassreddine, et al., "Map matching algorithm using interval analysis and Dempster-Shafer theory", Jul. 2009, 6 pages.
Qin, et al., "Detecting Anomalous Trajectories Using the Dempster-Shafer Evidence Theory Considering Trajectory Features from Taxi GNSS Data", Oct. 2018, 25 pages.
Sahir, "Canny Edge Detection Step by Step in Python—Computer Vision", Jan. 25, 2019, 18 pages.
Steyer, et al., "Grid-Based Environment Estimation Using Evidential Mapping and Particle Tracking", Jun. 2018, 13 pages.
Szucs, "Route planning with uncertain information using Dempster-Shafer theory", International Conference on Management and Service Science, Oct. 2009, 4 pages.
Thomas, et al., "Grid-based Online Road Model Estimation for Advanced Driver Assistance Systems", Jun. 2015, p. 71-76, 6 pages.
Thomas, et al., "Semantic Grid-Based Road Model Estimation for Autonomous Driving", Jun. 2019, 8 pages.
Thomas, et al., "Sensor-based road model estimation for autonomous driving", Jun. 2017, pp. 1764-1769, 6 pages.
Topfer, et al., "Efficient Road Scene Understanding for Intelligent Vehicles Using Compositional Hierarchical Models", May 2015, 10 pages.
Uzer, et al., "Dempster Shafer Grid-based Hybrid Fusion of Virtual Lanes for Autonomous Driving", Nov. 2019, pp. 3760-3765, 6 pages.
"Extended European Search Report", EP Application No. 21191288.6, dated Feb. 7, 2022, 9 pages.
Homayounfar, et al., "DAGMapper: Learning to Map by Discovering Lane Topology", 2019, pp. 2911-2920.

* cited by examiner

LANE-TYPE AND ROADWAY HYPOTHESES DETERMINATIONS IN A ROAD MODEL

BACKGROUND

Road-perception systems can provide vehicle-based systems with information about road conditions and road geometry, for example, to control an automobile on a roadway. Vehicles can use road-perception systems for a variety of vehicle-based systems that include: Automatic Cruise Control (ACC), Traffic-Jam Assist (TJA), Lane-Centering Assist (LCA), and L3/L4 Autonomous Driving on Highways (L3/L4). Some safety regulations require such vehicle-based systems to model the lanes of a roadway and identify the type of each lane. In addition, some safety standards require road models to quantify an uncertainty associated with each lane and its type. Existing road-perception systems are often inaccurate or cause unreliable road modeling, and uncertainty in their hypotheses may not be quantifiable to satisfy such regulations.

SUMMARY

This document describes techniques and systems for determinations of lane-type and roadway hypotheses in a road model. For example, this document describes a road-perception system configured to define lanes that make up portions of a roadway. Each lane is assigned multiple lane-type hypotheses. The road-perception system determines respective belief masses associated with the multiple lane-type hypotheses for each of the lanes. The road-perception system then determines, using the respective belief masses, a belief parameter and a plausibility parameter associated with each lane-type hypothesis. The multiple lane-type hypotheses is consolidated for each of the lanes into at least one roadway hypothesis, and a belief parameter and a plausibility parameter associated with each roadway hypothesis is determined. The described techniques and systems then determine whether the belief parameter and the plausibility parameter associated with each lane-type hypothesis of each of the at least one roadway hypothesis are each greater than a respective threshold value. Responsive to a determination that the belief parameter and the plausibility parameter of each lane-type hypothesis of one or more of the at least one roadway hypothesis are each greater than the respective threshold value, an autonomous-driving system or an assisted-driving system uses the roadway hypothesis to operate the vehicle on the roadway.

This document also describes other operations of the above-summarized system and other methods set forth herein, as well as means for performing these methods.

This Summary introduces simplified concepts for determinations of lane-type and roadway hypotheses in a road model, which are further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of determinations of lane-type and roadway hypotheses in a road model are described in this document with reference to the following figures. The same numbers are used throughout the drawings to reference like features and components.

DETAILED DESCRIPTION

Overview

Road-perception systems are an important technology for assisted-driving and autonomous-driving systems. Some driving systems (e.g., Level 2, Level 3, or Level 4 systems) and some safety standards (e.g., Safety of the Intended Functionality (SOTIF) of a system (ISO/PAS 21448:2019 "Road vehicles—Safety of the intended functionality")) require a road-perception system not only to model the lanes, the lane type, and the roadway itself, but also to quantify uncertainty in the model and maintain lane-type hypotheses and roadway hypotheses.

Some road-perception systems define a roadway as a combination of one or more sections with each section divided into strips. These systems generally identify each strip as the area between two lane-boundaries. Such systems and methodologies can be complex. In addition, these systems do not provide a clear way to update the roadway topology based on sensor data obtained by the vehicle.

In contrast, this document describes less-complex, and accurate road-perception techniques to estimate a belief parameter and plausibility parameter associated with lane types and the roadway in a road model. For example, these techniques can solve potential conflicts between different information sources to provide robust information for situation assessment and safe-path planning and maneuver control. In particular, an algorithmic framework is provided to fuse information from vision, trails (e.g., tracks using sensor measurements), and prior knowledge to estimate lane type and roadway type. From a belief parameter and a plausibility parameter associated with lane types, the road-perception system can determine an overall uncertainty associated with one or more road hypotheses. In this way, the described road-perception techniques and systems can provide critical information about the environment around a vehicle, especially corresponding to the roadway and the lanes therein, to provide safe path planning and maneuver control.

For example, the described techniques can define lane types in a road model and quantify the uncertainty associated with the lane types. A described road-perception system consolidates the lane sections into a set of proposed lanes. The road-perception system can then determine, using the uncertainty associated with the lane types, a belief parameter and a plausibility parameter associated with the lane-type hypotheses and roadway hypotheses. In this way, the described techniques and systems can quantify uncertainty in the road model and better fulfill the SOTIF requirements for L3/L4 systems. The described techniques and systems can also scale down to other autonomous-driving or assisted-driving systems with fewer sensors or different sensor configurations.

This section describes just one example of how the described techniques and systems can make determinations of lane-type and roadway hypotheses in a road model. This document describes other examples and implementations.

Operating Environment

Figure 1:
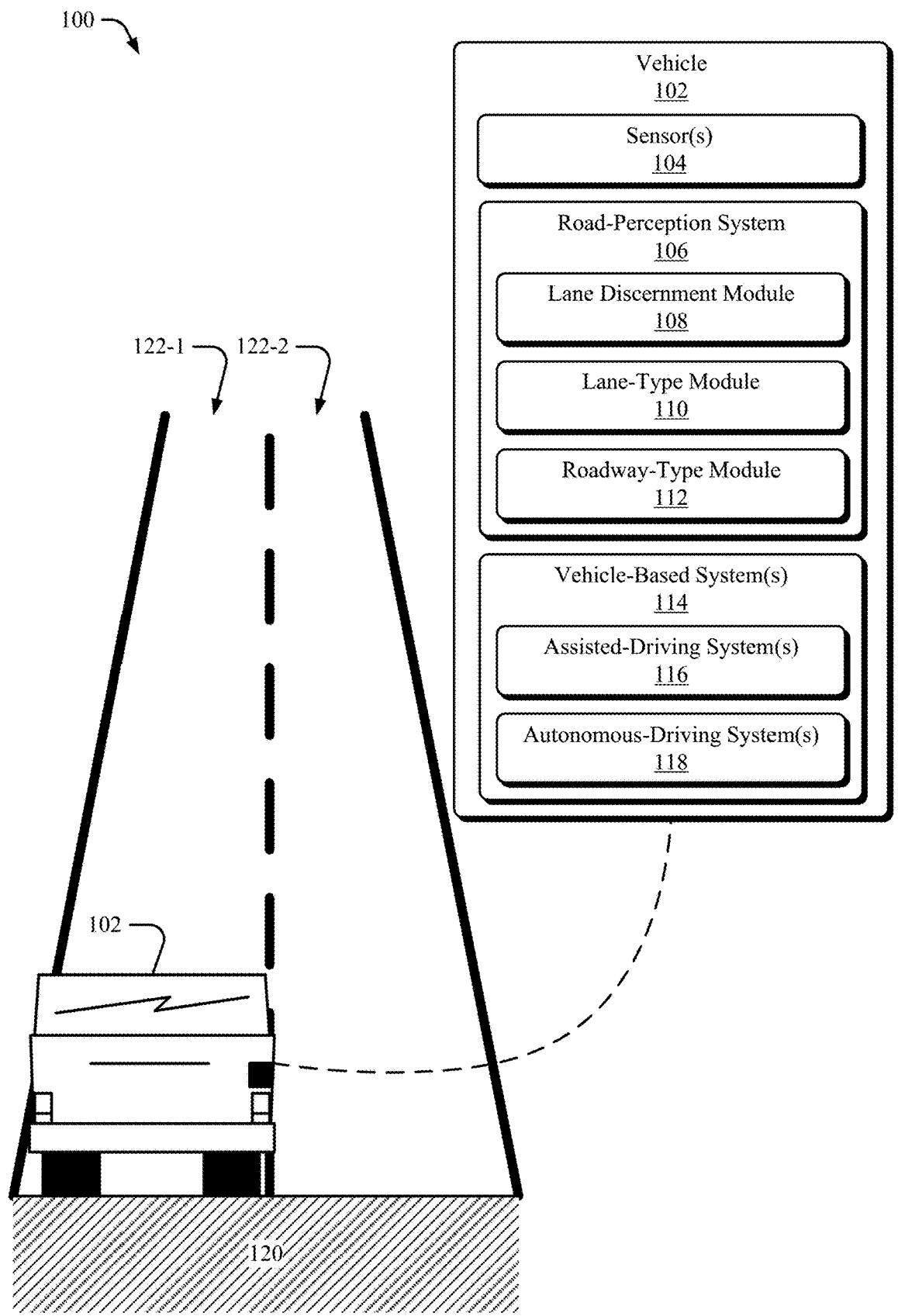
FIG. 1 illustrates an example environment in which determinations of lane-type and roadway hypotheses in a road model can be implemented.

FIG. 1 illustrates an example environment 100 in which determinations of lane-type and roadway hypotheses in a road model can be implemented. In the depicted environment 100, a road-perception system 106 is mounted to, or integrated within, a vehicle 102. The vehicle 102 can travel on a roadway 120, which includes lanes 122 (e.g., a first lane 122-1 and a second lane 122-2). In this implementation, the vehicle 102 is traveling in the first lane 122-1.

Although illustrated as a car, the vehicle 102 can represent other types of motorized vehicles (e.g., a motorcycle, a bus, a tractor, a semi-trailer truck, or construction equipment). In general, manufacturers can mount the road-perception system 106 to any moving platform that can travel on the roadway 120.

In the depicted implementation, a portion of the road-perception system 106 is mounted into a rear-view mirror of the vehicle 102 to have a field-of-view of the roadway 120. The road-perception system 106 can project the field-of-view from any exterior surface of the vehicle 102. For example, vehicle manufacturers can integrate at least a part of the road-perception system 106 into a side mirror, bumper, roof, or any other interior or exterior location where the field-of-view includes the roadway 120. In general, vehicle manufacturers can design the location of the road-perception system 106 to provide a particular field-of-view that sufficiently encompasses the roadway 120 on which the vehicle 102 may be traveling.

The vehicle 102 includes one or more sensors 104 to provide input data to one or more processors (not illustrated in FIG. 1) of the road-perception system 106. The sensors 104 can include a camera, a radar system, a global positioning system (GPS), a global navigation satellite system (GNSS), a lidar system, or any combination thereof. A camera can take still images or video of the roadway 120. A radar system or a lidar system can use electromagnetic signals to detect objects in the roadway 120 or features of the roadway 120. A GPS or GNSS can determine a position and/or heading of the vehicle 102. The vehicle 102 can include additional sensors to provide input data to the road-perception system 106 regarding the roadway 120 and the lanes 122 thereof. The road-perception system 106 can also obtain input data from external sources (e.g., nearby vehicles, nearby infrastructure, the internet) using vehicle-to-everything (V2X) or cellular communication technology.

The road-perception system 106 can estimate a belief parameter and a plausibility parameter associated with one or more roadway hypotheses for the roadway 120 and one or more lane-type hypotheses for the lanes 122 of a road model. The belief parameter represents the evidence supporting a hypothesis (e.g., the sum of belief masses of the subset of the hypothesis) and provides a lower bound. The belief parameter of a lane-type hypothesis is indicative of a confidence of the road-perception system 106 in identifying a lane type for a particular lane 122. The plausibility parameter represents one minus the evidence not supporting the hypothesis (e.g., one minus the sum of belief masses of the sets whose intersection with the hypothesis is empty) and is an upper bound. The plausibility of the lane-type hypothesis is indicative of a likelihood in the lane type being applicable to a particular lane 122. Similarly, the belief parameter of a roadway hypothesis is indicative of a confidence of the road-perception system 106 in the combination of lane types associated with each lane 122 of the roadway 120. The plausibility parameter of the roadway hypothesis is indicative of a likelihood in the combination of lane types being applicable to the roadway 120.

The road-perception system 106 includes a lane discernment module 108, a lane-type module 110, and a roadway-type module 112. The lane discernment module 108 can determine a topology of the roadway 120, along with the lanes 122, as represented by a collection of lane sections. The lane discernment module 108 can identify the lane sections from various information sources, including, for example, the sensors 104 (e.g., radar measurements, vision measurements from a camera system) or previous knowledge (e.g., from a map database, previous data collected by the sensors 104). The lane discernment module 108 can also compute an uncertainty or mass value associated with each lane section.

The lane-type module 110 can consolidate the lane sections into a set of proposed lanes in a road model. The lane-type module 110 can also identify lane-type hypotheses for the lanes 122. The lane-type module 110 can also, using the mass values associated with the lanes 122, estimate the belief parameter (e.g., confidence) and the plausibility parameter (e.g., likelihood) associated with the one or more lane-type hypotheses.

The roadway-type module 112 can consolidate the lane types or lane-type hypotheses into one or more roadway hypotheses. The roadway-type module 112 can also, using the uncertainty associated with each lane-type hypothesis, estimate the belief parameter and the plausibility parameter associated with each roadway hypothesis. This document describes the components and operations of the road-perception system 106 in greater detail with respect to FIG. 2.

The vehicle 102 also includes one or more vehicle-based systems 114 that can use data from the road-perception system 106 to operate the vehicle 102 on the roadway 120. The vehicle-based systems 114 can include an assisted-driving system 116 and an autonomous-driving system 118 (e.g., an Automatic Cruise Control (ACC) system, Traffic-Jam Assist (TJA) system, Lane-Centering Assist (LCA) system, and L3/L4 Autonomous Driving on Highways (L3/L4) system). Generally, the vehicle-based systems 114 use the road-perception data provided by the road-perception system 106 to perform a function. For example, the assisted-driving system 116 can provide automatic cruise control and monitor for the presence of an object (as detected by another system on the vehicle 102) in the first lane 122-1, in which the vehicle 102 is traveling. In this example, the road-perception data from the road-perception system 106 identify the lanes 122. As another example, the assisted-driving system 116 can provide alerts when the vehicle 102 crosses a lane marker for the first lane 122-1.

The autonomous-driving system 118 may move the vehicle 102 to a particular location on the roadway 120 while avoiding collisions with objects detected by other systems (e.g., a radar system, a lidar system) on the vehicle 102. The road-perception data provided by the road-perception system 106 can provide information about the location of the lanes 122 and uncertainty in the location of the lanes 122 to enable the autonomous-driving system 118 to perform a lane change or steer the vehicle 102.

Figure 2:
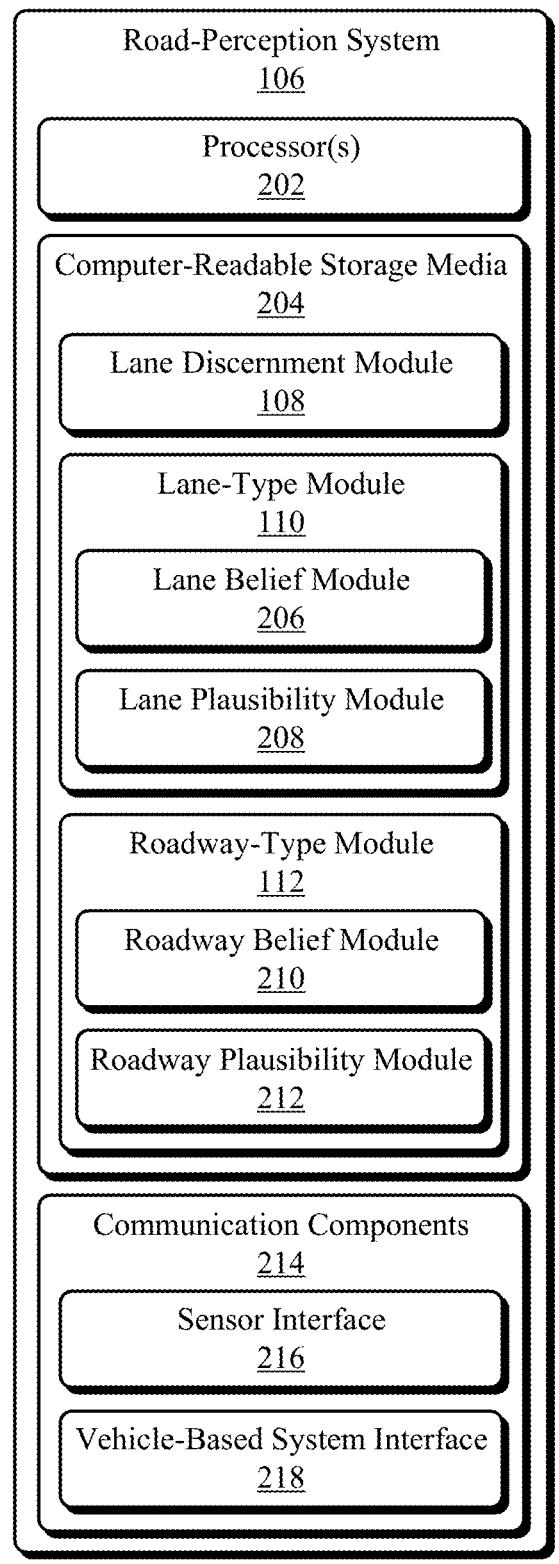
FIG. 2 illustrates an example configuration of a road-perception system.

FIG. 2 illustrates an example configuration of the road-perception system 106. The road-perception system 106 can include one or more processors 202 and computer-readable storage media (CRM) 204.

The processor 202 can be include, as non-limiting examples, a system on chip (SoC), an application processor (AP), a central processing unit (CPU), or a graphics processing unit (GPU). The processor 202 may be a single-core processor or a multiple-core processor implemented with a homogenous or heterogenous core structure. The processor 202 may include a hardware-based processor implemented as hardware-based logic, circuitry, processing cores, or the like. In some aspects, functionalities of the processor 202 and other components of the road-perception system 106 are provided via an integrated processing, communication, and/or control system (e.g., system-on-chip), which may enable various operations of the vehicle 102 in which the system is embodied.

The CRM 204 described herein excludes propagating signals. The CRM 204 may include any suitable memory or storage device such as random-access memory (RAM), static RAM (SRAM), dynamic RAM (DRAM), non-volatile RAM (NVRAM), read-only memory (ROM), or Flash memory useable to store device data (not illustrated) of the road-perception system 106.

The processor 202 executes computer-executable instructions stored within the CRM 204. As an example, the processor 202 can execute the lane discernment module 108 to define lane sections of the roadway 120 and determine an uncertainty or mass value associated with the lane sections. The lane discernment module 108 can determine lane sections of the roadway 120 by, for example, extracting them from a high-definition map stored in the CRM 204 and/or tracking them using data from the sensors 104. The lane discernment module 108 can also estimate a belief mass associated with each lane section.

Similarly, the processor 202 can execute the lane-type module 110 to consolidate the lane sections into lanes with respective lane types and estimate a belief parameter and a plausibility parameter associated with one or more lane-type hypotheses. The processor 202 can also execute the roadway-type module 112 to consolidate the lane-type hypotheses into one or more roadway hypotheses and estimate a belief parameter and a plausibility parameter associated therewith. The processor 202 can also generate road-perception data for the vehicle-based systems 114.

The lane-type module 110 can group, based on the Dempster-Shafer Theory, the lane sections into one or more lane-type hypotheses. The Dempster-Shafer Theory provides a framework for reasoning about a set of hypotheses that are subject to uncertainty. The Dempster-Shafer Theory is a generalization of Bayesian probability theory that accounts for lack of evidence or ignorance when estimating the likelihood of a hypothesis being true. The generation of the lane-type hypotheses is described in greater detail with respect to FIG. 4.

The lane-type module 110 can include a lane belief module 206 and a lane plausibility module 208. The lane belief module 206 can estimate, using a mass value associated with each of the lanes 122, a belief parameter for each lane-type hypothesis. The lane plausibility module 208 can estimate, using the mass value associated with each of the lanes 122, a plausibility parameter for each lane-type hypothesis.

The roadway-type module 112 can include a roadway belief module 210 and a roadway plausibility module 212. The roadway belief module 210 can combine the belief masses of the lane-type hypotheses into an estimate of a belief parameter associated with each of the one or more roadway hypotheses. The roadway plausibility module 212 can use the belief masses of the lane-type hypotheses to estimate a plausibility parameter associated with each of the one or more roadway hypotheses.

The communication components 214 can include a sensor interface 216 and a vehicle-based system interface 218. The sensor interface 216 and the vehicle-based system interface 218 can transmit data over a communication bus of the vehicle 102, for example, when the individual components of the road-perception system 106 are integrated within the vehicle 102.

The processor 202 can also receive, via the sensor interface 216, measurement data from the one or more sensors 104 as input to the road-perception system 106. As an example, the processor 202 can receive image data or video data from a camera via the sensor interface 216. Similarly, the processor 202 can send, via the sensor interface 216, configuration data or requests to the one or more sensors 104.

The vehicle-based system interface 218 can transmit road-perception data to the vehicle-based systems 114 or another component of the vehicle 102. In general, the road-perception data provided by the vehicle-based system interface 218 is in a format usable by the vehicle-based systems 114. In some implementations, the vehicle-based system interface 218 can send information to the road-perception system 106, including, as a non-limiting example, the speed or heading of the vehicle 102. The road-perception system 106 can use this information to configure itself appropriately. For example, the road-perception system 106 can adjust, via the sensor interface 216, a frame rate or scanning speed of one or more sensors 104 based on the speed of the vehicle 102 to maintain performance of the road-perception system 106 under varying driving conditions.

Operations of the lane discernment module 108, the lane-type module 110, the roadway-type module 112, and their respective subcomponents are described in greater detail with respect to FIGS. 3 through 9.

Figure 3:
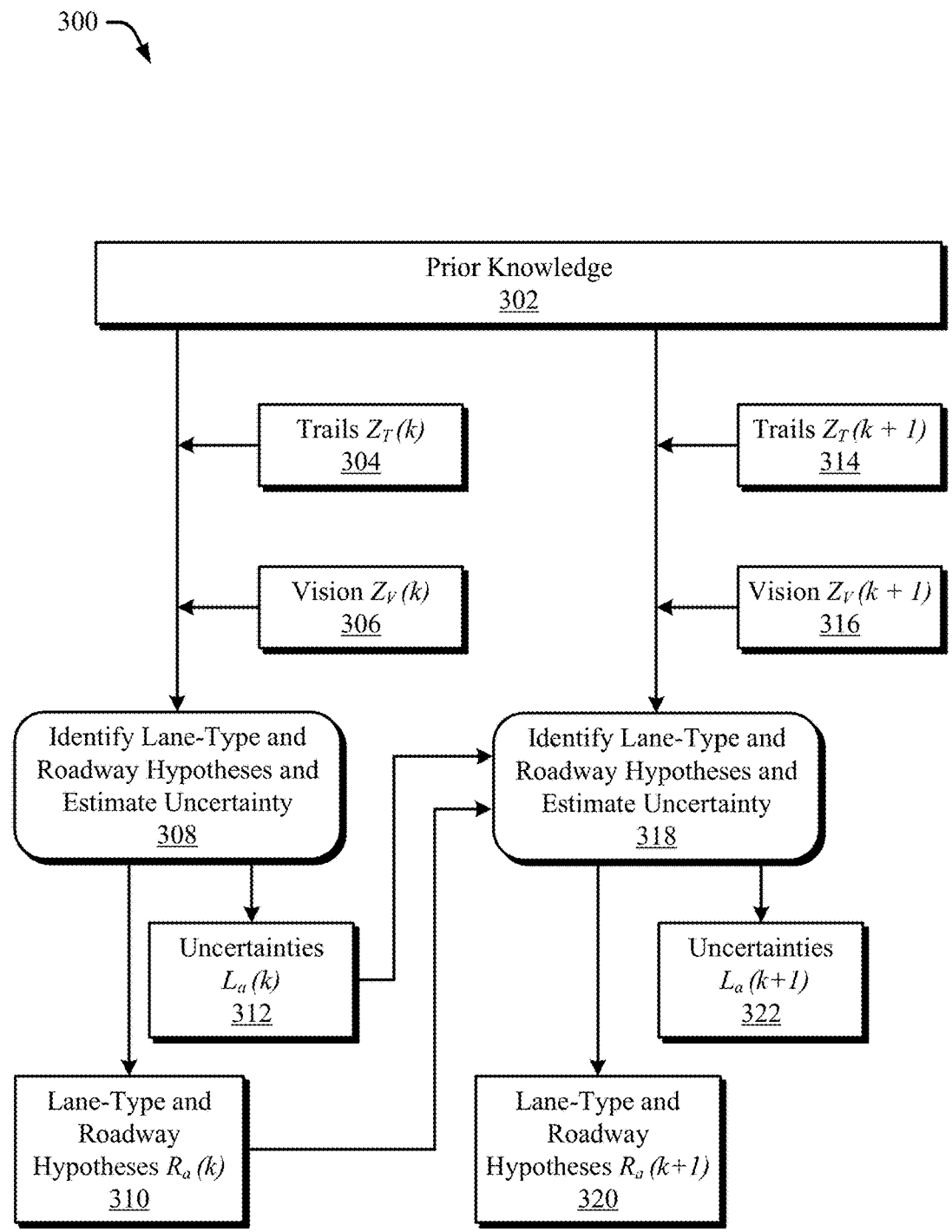
FIG. 3 illustrates an example flowchart of a road-perception system configured to determine uncertainty associated with lane-type hypotheses and roadway hypotheses in a road model.

FIG. 3 illustrates an example flowchart 300 of the road-perception system 106 configured to determine uncertainty associated with lane-type hypotheses and roadway hypotheses in a road model. The flowchart 300 illustrates example operations of the road-perception system 106 of FIG. 1. The road-perception system 106 defines road lanes (e.g., lanes 122-1 and 122-2) as the basic component of the road model.

The road-perception system 106 can use various forms of evidence (e.g., sensor data from sensors 104) to identify lane-type hypotheses, roadway hypotheses, and the uncertainty associated therewith. For example, the road-perception system 106 can use prior knowledge 302, trails 304, vision 306 information. The prior knowledge 302 can include information from a map or database stored in the CRM 204 or previous lane-type information determined from a previous occasion on the roadway 120. For example, the map can include a high-definition map included in the CRM 204 of the road-perception system 106 or memory of the vehicle 102, a map retrieved from a map or navigation service in communication with the road-perception system 106, a map obtained from a mobile phone or other device communicatively coupled to the road-perception system 106. The trails 304 can include radar or lidar information about the lanes 122, $Z_T(k)$, obtained from one or more sensors 104 for the time instant k. The vision 306 includes camera or video information about the lanes 122, $Z_V(k)$, obtained from one or more sensors 104 for the time instant k. The road-perception system 106 can use other types of evidence to form the lane-type hypotheses and roadway hypotheses or to estimate an uncertainty associated therewith. For example, data or measurements may be obtained from sensors located outside the vehicle 102 (e.g., embedded in a roadway, integrated with a sign or marker, on-board another vehicle located near the vehicle 102).

At 308, the road-perception system 106 develops a road model for the lanes 122 of the roadway 120 using the multiple sources of information and evidence. In particular, the road-perception system 106 determines one or more lane-type and roadway hypotheses, 310, $R_a(k)$, for the time instant k. The road-perception system 106 also determines uncertainties 312, $L_a(k)$, for the time instant k associated with the one or more lane-type and roadway hypotheses, 310, $R_a(k)$. For each source of information (e.g., the prior knowledge 302, trails 304, and vision 306), the road-perception system 106 assigns the uncertainties 312. As described in greater detail below, the road-perception system 106 can use the Dempster-Shafer theory to resolve potential conflicts between the different sources of information.

At the next time instant (k+1), the road-perception system 106 can use the same or different forms of evidence to identify new or updated lane-type hypotheses, roadway hypotheses, and the uncertainty associated therewith. For example, the road-perception system 106 can use prior knowledge 302, trails 314, $Z_T(k+1)$, obtained from one or more sensors 104 for the time instant (k+1), and vision 316, $Z_V(k+1)$, obtained from one or more sensors 104 for the time instant (k+1). In addition, the road-perception system 106 can use the one or more lane-type and roadway hypotheses 310, $R_a(k)$, and the uncertainties 312, $L_a(k)$, from the previous time instant k.

At 318, the road-perception system 106 develops a road model for the lanes 122 of the roadway 120 using the multiple sources of information and evidence. In particular, the road-perception system 106 determines one or more lane-type and roadway hypotheses, 320, $R_a(k+1)$, for the time instant (k+1). For each source of information (e.g., the prior knowledge 302, trails 304, vision 306, lane-type and roadway hypotheses 310, uncertainties 312, trails 314, and vision 316), the road-perception system 106 assigns uncertainties 322 for the time instant (k+1). In this way, the road-perception system 106 recursively identifies the lane-type hypotheses, roadway hypotheses, and respective uncertainties. The road-perception system 106 can fuse the previous hypotheses and uncertainties with new observations from the trails 314 and vision 316.

The road-perception system 106 can dynamically update the lane-type hypotheses, roadway hypotheses, and respective uncertainties at discrete time intervals. The time interval for the information update can depend on a tradeoff between accuracy and computational workload. In some implementations, the vehicle-based systems 114 can dynamically alter the time interval depending on road conditions, the driving environment, speed of the vehicle 102, and other considerations.

Figure 4:
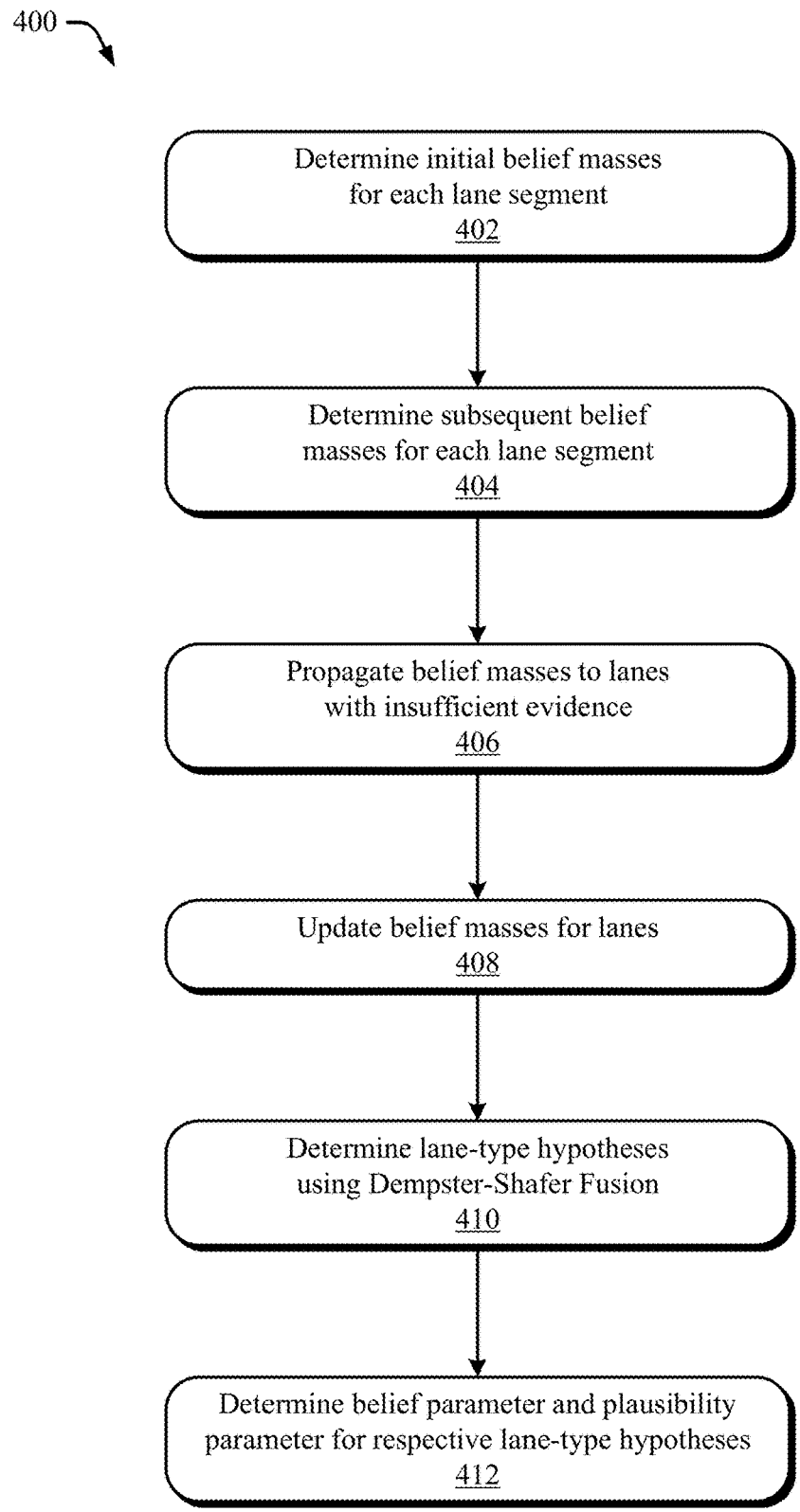
FIG. 4 illustrates an example flowchart of a lane-type module to generate lane-type hypotheses in a road model.

FIG. 4 illustrates an example flowchart 400 of the lane-type module 110 to generate lane-type hypotheses in a road model. The flowchart 400 illustrates example operations of the lane-type module 110 of FIG. 1. The lane-type module 110 can perform fewer or additional operations to determine one or more lane-type hypotheses for the lanes 122 of the roadway 120.

At 402, the lane-type module 110 determines initial belief masses for lane-type hypotheses. Because prior belief masses are not initially available, the lane-type module 110 can determine initial belief masses based on evidence from the sensors 104. Prior belief masses may not be available, for example, because the vehicle 102 is traveling on a new roadway 120 or the roadway 120 is undergoing construction. The lane-type module 110 determines a belief mass for each lane segment in the road model based on this evidence, which is described in greater detail with respect to FIGS. 6 through 8.

At 404, the lane-type module 110 determines belief masses for each lane segment at subsequent time intervals. Consider that at time instant k, the lane-type module 110 has determined a belief mass for the lane segment $L_i$. The lane-type module 110 can use this belief mass to determine the belief mass for the same lane segment at time instant k+1, which is denoted as $L_{i,k+1}$, using the following equation:

$$m_p(L_{i,k+1}) = \alpha m(L_{i,k}) \quad (1)$$

where the decay factor, $\alpha$, is a constant with a value between 0 and 1. The value of the decay factor can be set based on empirical studies or adjusted based on the relative confidence of the belief mass associated with particular types of evidence.

At 406, if no evidence is available for a lane segment (e.g., $L_{j,k}$) at the time instant k, the lane-type module 110 can propagate the belief mass of another lane segment (e.g., $L_{i,k}$) at the same time instant to that lane segment (e.g., $m(L_{i,k}) \rightarrow m_p(L_{j,k})$). As an example, if the roadway 120 includes multiple lanes 122, the lane-type module 110 may encounter some lanes without sufficient observations to update the belief masses. In such circumstances, the lane-type module 110 can, for example, propagate the belief masses based on a spatial (or geometric) relationship between the lanes. Consider that lane segments 1, 2, and 3 form a contiguous thru-lane and that lane segment 4 is adjacent to lane segment 3, but begins anew (e.g., a new highway lane). In this scenario, the belief mass for lane segment 4 can be propagated from the other lane segments 1, 2, and 3 using the following equation:

$$m_{4,k}(\cdot) = \frac{K(\|g_4 - g_2\|)m_{2,k}(\cdot) + K(\|g_4 - g_1\|)m_{1,k}(\cdot) + K(\|g_4 - g_3\|)m_{3,k}(\cdot)}{K(\|g_4 - g_2\|) + K(\|g_4 - g_1\|) + K(\|g_4 - g_3\|)} \quad (2)$$

where $m_i(\cdot)$ denotes the mass value for a specific hypothesis, $g_i$ denotes the geometric center of the ith lane segment, and $K(\ )$ is the kernel function that describes the correlation between different lanes.

At 408, the lane-type module 110 updates the belief masses for lane segments for which evidence is available. The belief mass for these lane segments is determined from the available evidence and is denoted $m_e(L_i)$, where the subscript e stands for evidence-based belief mass. The lane-type module 110 then uses a Dempster-Shafer fusion rule to update the mass for each hypothesis:

$$m(L_i) \leftarrow m_p(L_i) \oplus m_e(L_i) \quad (3)$$

The lane-type module 110 can then use the updated mass value to determine the mass value for other lane segments without any evidence. In the above example, the accuracy of $m_p(L_i)$ is improved by $m_e(L_i)$.

At 410, the lane-type module 110 determines lane-type hypotheses using the different types of evidence available for the lane type of the lanes 122. The lane-type module 110 can fuse the different sources of evidence together to determine robust lane-type hypotheses using the Dempster-Shafer fusion rule. In the following description, this document describes how the lane-type module 110 can fuse two information sources. Similar procedures can be sequentially followed for additional sources of information.

Consider that the road-perception system 106 has two different sources of evidence regarding the lane type of a particular lane available. This document denotes these two sources of evidence as $m_1(\cdot)$ and $m_2(\cdot)$, respectively. According to the Dempster-Shafer Theory, the lane-type module 110 has the following information:

$$m_{1,2}(\emptyset) = 0 \quad (4)$$

$$m_{1,2}(A) = m_1(A) \oplus m_2(A) = \frac{1}{1-K} \sum_{B \cap C = A \neq \emptyset} m_1(B) m_2(C) \quad (5)$$

where $$K = \Sigma_{B \cap C = \emptyset} m_1(B) m_2(C) \quad (6)$$

In Equation (5), 1−K is the normalization coefficient, and K denotes the conflict between the evidence.

At 412, the lane-type module 110 determines a belief parameter and a plausibility parameter for each of the one or more lane-type hypotheses. The lane-type module 110 can calculate the belief parameter, bel(A), and the plausibility parameter, pl(A), of a specific lane-type hypothesis A, using the following respective equations:

$$\text{bel}(A) = \Sigma_{B | B \subseteq A} m(B) \quad (7)$$

and $$\text{pl}(A) = \Sigma_{B | B \cap A \neq \emptyset} m(B). \quad (8)$$

Figure 5:
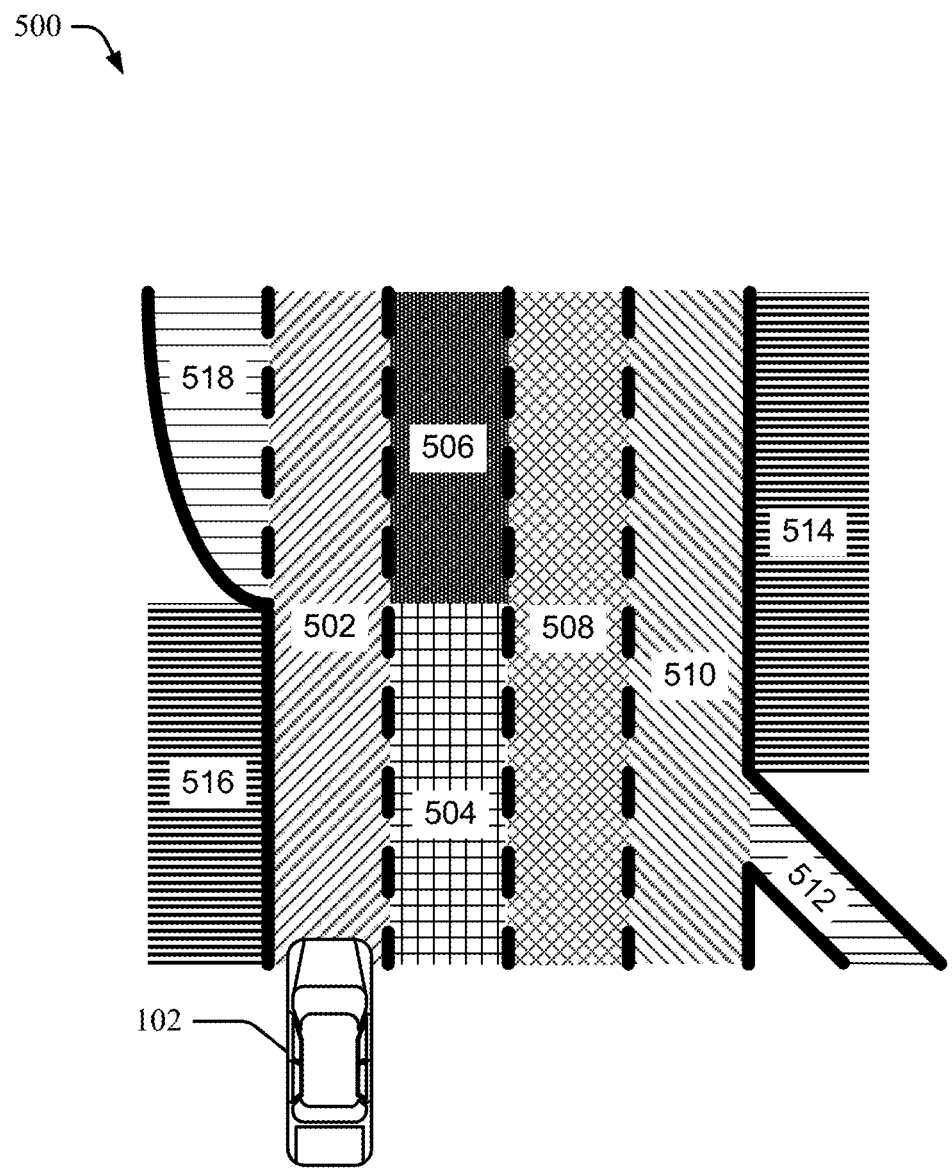
FIG. 5 illustrates an example set of lanes defined by a lane-type module of the road-perception system.

FIG. 5 illustrates an example set of lanes 500 defined by the lane-type module 110 of the road-perception system 106. The set of lanes 500 includes lanes 502, 504, 506, 508, 510, 512, 514, 516, and 518. The set of lanes 500 makes up portions of a roadway on which the vehicle 102 is traveling. In the depicted illustration, the vehicle 102 is traveling in the lane 502.

The possible states for the lane type of the lanes 500 include a through lane (e.g., the lanes 502, 508, and 510), a deceleration lane (e.g., the lane 518), an acceleration lane (e.g., the lane 512), a shoulder (e.g., the lanes 514 and 516), and an ending lane (e.g., the lanes 504 and 506). Based on the region or country in which the vehicle 102 is traveling, the road-perception system 106 or the lane-type module 110 can define additional or fewer possible states for the lane type of the lanes 500.

For the lanes 500, the lane-type module 110 can represent the state of each lane using the following frame of discernment (FOD): $\{L_t, L_a, L_d, L_s, L_e,\}$, where $L_t$ represents a through lane, $L_a$ represents an acceleration lane, $L_d$ represents a deceleration lane, $L_s$ represents a shoulder, and $L_e$ represents an ending lane. The lane-type module 110 can also define an ending lane (e.g., lane 504) as a through lane or a deceleration lane with a shoulder or blockage ahead (e.g., lane 506). As described above, the lane-type module 110 can use map data and/or sensor measurements to define the type of each lane in the set of lanes 500.

Based on the region or country in which the vehicle 102 is traveling, the road-perception system 106 or the lane-type module 110 can define additional or fewer possible states for the lane type. If the output of the road hypotheses by the road-perception system 106 is limited or reduced, the lane-type module 110 can reduce the FOD size to $\{L_t, L_d, L_s\}$. In other implementations, if the vehicle-based systems 114 only require information about whether a current traveling lane is an exit lane or a through lane, the lane-type module 110 can further reduce the FOD size to $\{L_t, L_d\}$. The size and design of the lane-type FOD provided by the lane-type module 110 depend on the tasks and problems being addressed by the vehicle-based systems 114. The output of the lane-type module 110 can be flexibly adapted according to the requirements of the downstream vehicle-based systems 114.

Figure 6:
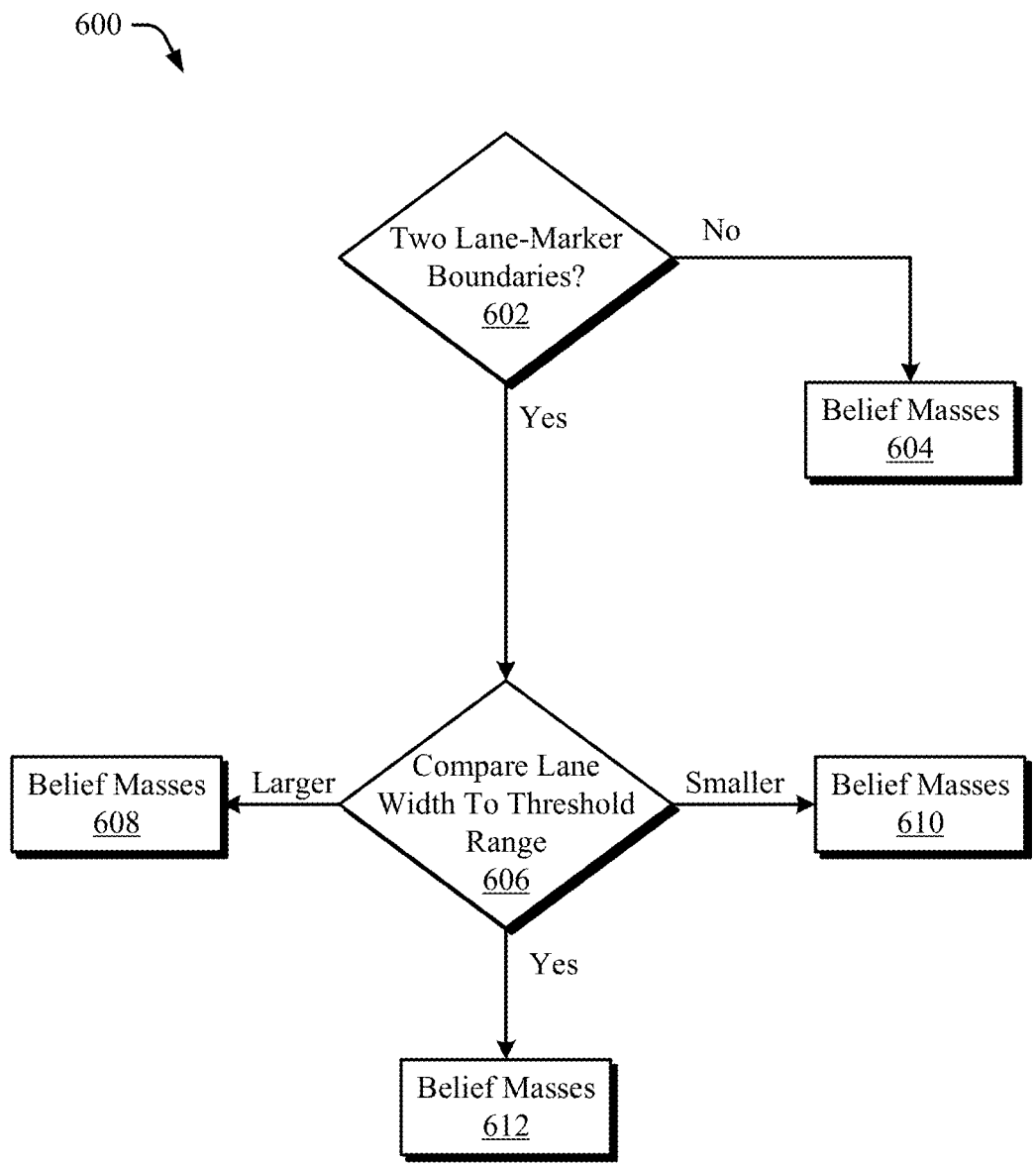
FIG. 6 illustrates an example flowchart of belief masses assigned by a lane-type module based on lane markers.

FIG. 6 illustrates an example flowchart 600 of belief masses assigned by the lane-type module 110 based on lane markers. The flowchart 600 illustrates example operations of the lane-type module 110 of FIG. 1 based on vision evidence (e.g., the vision evidence 306, $Z_V(k)$).

At 602, the lane-type module 110 determines if two lane-marker boundaries are available in the evidence. If both the left-lane and right-lane markers are not available for the current lane (e.g., only one lane marker is available), the lane-type module 110 assigns belief masses 604 accordingly. For example, if there is only one side lane marker available and the lane marker is solid, the lane-type module 110 assigns a high belief mass value to $L_s$ and a low belief mass value to $L_t$ and $L_d$. Examples of the values for the belief masses 604 assigned by the lane-type module 110 are provided in Table 1 below. The values in Table 1 are dependent on the type of the lane marker boundary (e.g., solid lane marker, dashed lane marker) and a boundary position of the lane marker (e.g., left, right). The belief masses 604 for a given circumstance (e.g., solid left-lane marker) sum to one.

TABLE 1

|  | Solid Left-Lane Marker | Solid Right-Lane Marker | Dashed Left-Lane Marker | Dashed Right-Lane Marker |
|---|---|---|---|---|
| ($L_t$), ($L_d$), ($L_s$) | {0.1}, {0.1}, {0.3} | {0.2}, {0.2}, {0.1} | {0.6}, {0.3}, {0.1} | {0.6}, {0.3}, {0.1} |
| ($L_t$, $L_d$) |  | {0.5} |  |  |
| ($L_t$, $L_d$, $L_s$) | {0.5} |  |  |  |

At 606, the lane-type module 110 compares the width between the two lane-marker boundaries to a lane-width threshold range. If the lane width between the two lane-marker boundaries is larger than the lane-width threshold range, the lane-type module 110 assigns belief masses 608 accordingly. For example, the lane-type module 110 can assign a high belief mass value to $L_d$ and $\{L_d, L_t\}$ and a low belief mass value to $L_s$. If the lane width between the two lane-marker boundaries is smaller than the lane-width threshold range, the lane-type module 110 assigns belief masses 610 accordingly. For example, the lane-type module 110 can assign a high belief mass value to $L_s$ and a low belief mass value to $L_d$, $L_t$, and $\{L_d, L_t\}$.

If the lane width between the two lane-marker boundaries fits within the lane-width threshold range, the lane-type module 110 can assign belief mass values 612 accordingly. For example, the lane-type module can assign a high belief mass value to $L_t$, $L_d$, and $\{L_d, L_t\}$ and a low belief mass value to $L_s$. If the right-lane boundary is solid, the lane-type module 110 can assign a high belief mass value to $L_d$ and $\{L_t, L_d\}$. If the left-lane boundary is solid, the lane-type module 110 can assign a high belief mass value to $L_t$ and $\{L_t, L_d\}$. If the lane-boundary markers are solid, the lane-type module 110 can assign a high belief mass value to $L_t$.

Based on these example rules illustrated in flowchart 600, the lane-type module 110 can determine a belief mass value corresponding to specific observations. Examples of the values for the belief masses 608, 610, and 612 assigned by the lane-type module 110 are provided in Table 2 below. The lane-type module 110 can implement other rules based on other flowcharts, decision trees, or look-up tables.

TABLE 2

| | | | Lane Width Fits | | |
|---|---|---|---|---|---|
| | Lane Width Smaller | Lane Width Larger | Dashed Markers | Left Dashed, Right Solid | Left Solid, Right Dashed | Solid Markers |
| $(L_t)$, | {0.2}, | {0.33}, | {0.85}, | {0.24}, | {0.6}, | {0.24}, |
| $(L_d)$, | {0.1}, | {0.66}, | {0.14}, | {0.24}, | {0.2}, | {0.24}, |
| $(L_s)$ | {0.7} | {0.01} | {0.01} | {0.02} | {0.01} | {0.02} |
| $(L_t, L_d)$ | | | | {0.5} | {0.19} | {0.5} |

The lane-type module 110 can also compare the curvature of two different lane boundaries to assign the mass values for a through lane, $L_t$, or a deceleration lane, $L_d$. The lane-type module 110 can compare the curvature vector of one lane-marker boundary with the curvature vector of an adjacent lane-marker boundary. If the difference between the curvature vectors is larger than a threshold value, this provides an indication that the lane bounded by the two lane-marker boundaries is a deceleration lane as opposed to a through lane.

In particular, the lane-type module 110 can obtain discrete lane-marker points for two or more lane-marker boundaries. The lane-type module 110 can then calculate curvature values for each lane-marker boundary based on the discrete lane-marker points. The lane-type module 110 can compile curvature values for each lane-marker boundary as a series and compare the distance between the data series for two adjacent lane-marker boundaries. If the lane bounded by the two lane-marker boundaries is a through lane, the distance between the two data series should be close to zero. If the lane is a deceleration lane (e.g., an exit lane), the distance between the two data series will not be equal to or about equal to zero. The lane-type module 110 can use a mapping function to build a connection between curvature differences and the belief mass assigned to a through lane or deceleration lane.

The lane-type module 110 can also compare normal vectors from the discrete lane-marker points to identify a curvature difference. The lane-type module 110 can assume the distance between the lane-marker boundaries is between 0 and 10 and use the following function as the mapping function:

$$L_t = e^{-ax^2} \quad (9)$$

The parameters of the mapping function can be calibrated and tuned based on specific applications. As an example, the factor a can be set to a value of 0.5. The lane-type module 110 can also define the mass value of $L_d$ as $1-L_t$. In this scenario, the lane-type module 110 assumes there are only two choices: $L_d$ or $L_t$.

Figure 7:
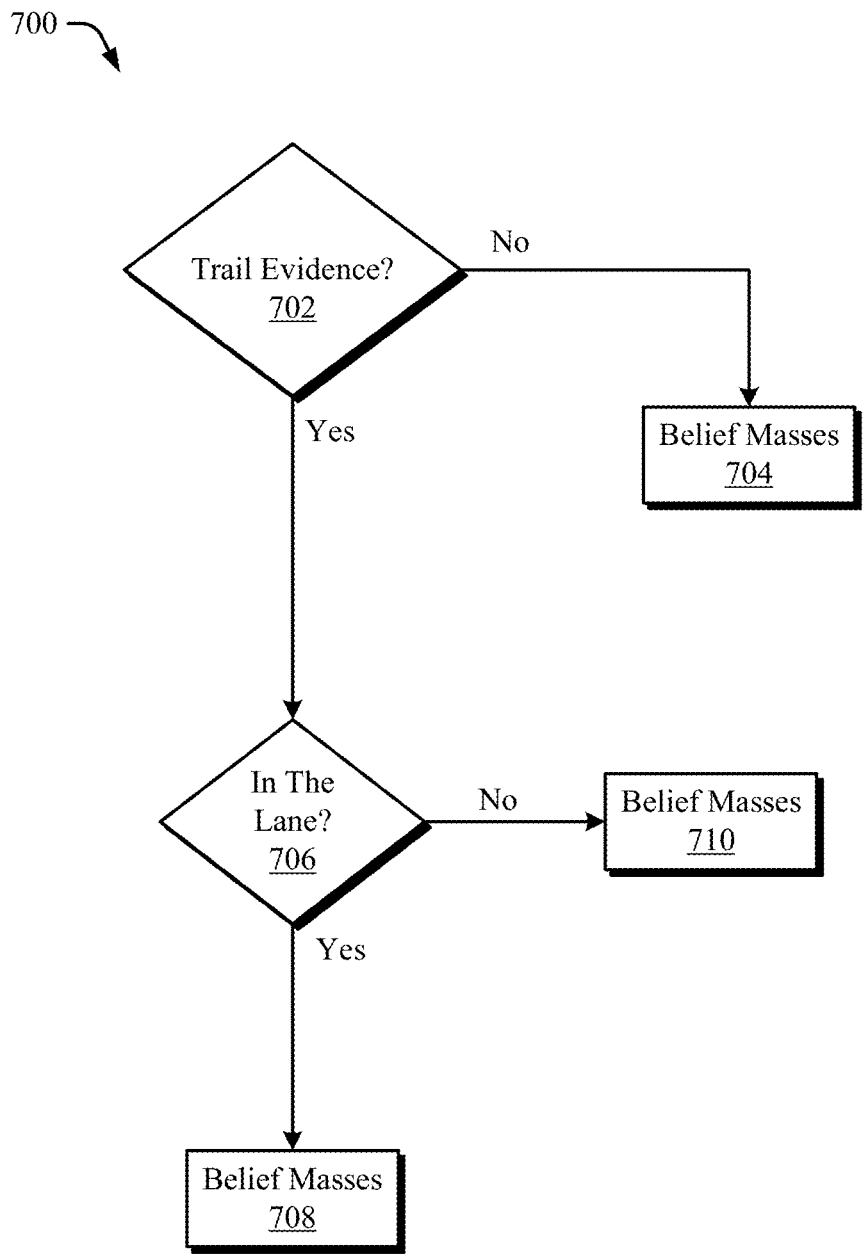
FIG. 7 illustrates an example flowchart of belief masses assigned by a lane-type module based on trail evidence.

FIG. 7 illustrates an example flowchart 700 of belief masses assigned by the lane-type module 110 based on trail evidence. The flowchart 700 illustrates example operations of the lane-type module 110 of FIG. 1.

At 702, the lane-type module 110 determines whether the road-perception system 106 includes trail evidence. If there is no trail evidence, the lane-type module 110 assigns belief masses 704 accordingly.

At 706, if the road-perception system 106 includes trail evidence for the current lane, the lane-type module 110 determines whether the trail evidence is within the lane boundaries of the current lane. If the trail evidence is within the lane boundaries of the current lane, the lane-type module 110 assigns belief masses 708 accordingly. For example, the lane-type module 110 can assign a high belief mass value to $L_t$, $L_d$, and $\{L_d, L_t\}$ and a low belief mass value to $L_s$.

If the trail evidence is not within the lane boundaries of the current lane, the lane-type module 110 assigns belief masses 710 accordingly. For example, the lane-type module 110 can assign a high belief mass value to $L_s$, $L_e$, a medium belief mass value to $\{L_s, L_d, L_t, L_e\}$, and a low belief mass value to $L_d$, $L_t$, and $\{L_t, L_d\}$ if there is no trail evidence for the current lane, but many trails for other lanes of the roadway 120. If there are few trails on any lane of the roadway 120, the lane-type module 110 can assign a high belief mass value to $\{L_s, L_d, L_t\}$ and a medium belief mass value to $L_s$.

Based on the example rules illustrated in flowchart 700, the lane-type module 110 can determine a mass value corresponding to specific observations. The lane-type module 110 can implement other rules based on other flowcharts, decision trees, or look-up tables. Examples of the values for the belief masses 704, 708, and 710 assigned by the lane-type module 110 are provided in Table 3 below.

TABLE 3

| | No Trail Evidence | Trail Evidence, But Not In Current Lane | Trail Evidence In Current Lane |
|---|---|---|---|
| $(L_t)$, $(L_d)$, | {0.1}, {0.1}, | {0.2}, {0.2}, | {0.2}, {0.2}, |
| $(L_s)$ | {0.3} | {0.3} | {0.01} |
| $(L_t, L_d)$ | | {0.3} | {0.59} |
| $(L_t, L_d, L_s)$ | {0.5} | | |

Figure 8:
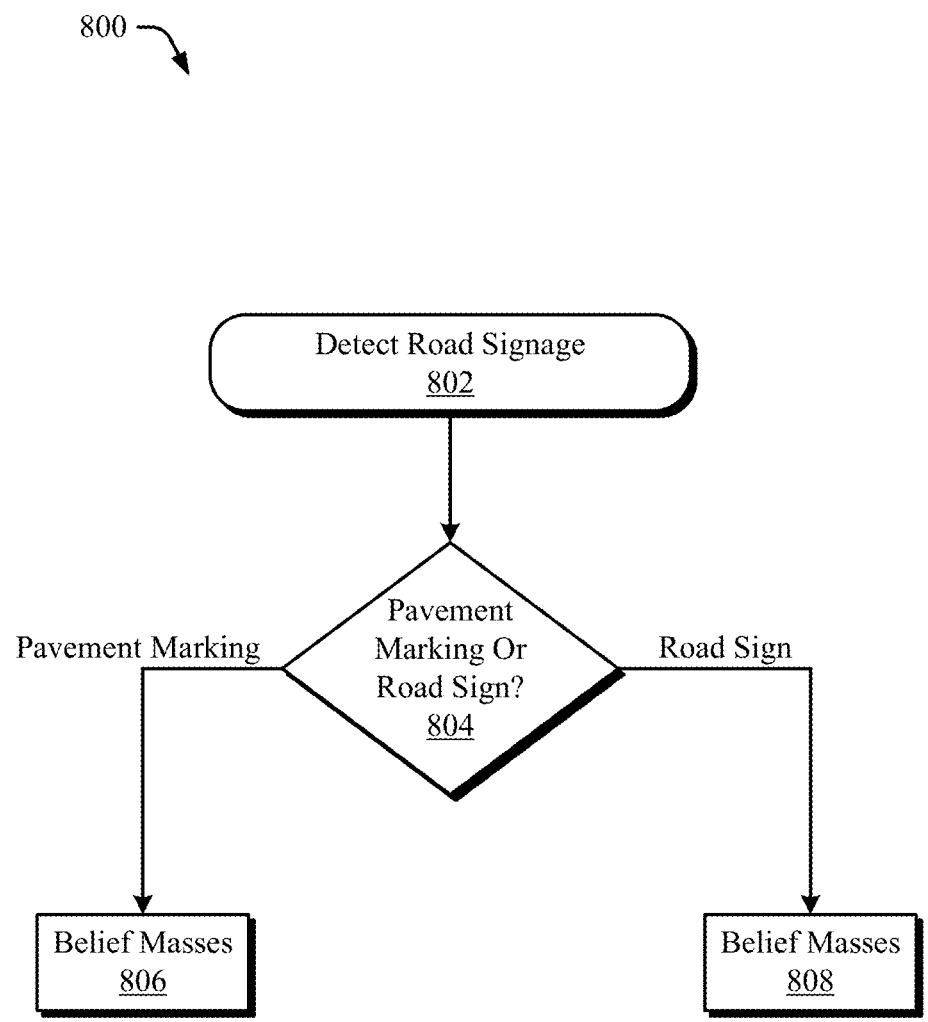
FIG. 8 illustrates an example flowchart of belief masses assigned by a lane-type module based on road signage.

FIG. 8 illustrates an example flowchart 800 of belief masses assigned by the lane-type module 110 based on road signage. The road signage can include traffic signs and pavement markings. The flowchart 800 illustrates example operations of the lane-type module 110 of FIG. 1.

At 802, the lane-type module 110 determines whether road signage was detected by one or more of the sensors 104 (e.g., a camera system). The lane-type module 110 can also detect road signage based on data included in a map or database associated with the roadway 120 on which the vehicle 102 is traveling.

At 804, the lane-type module 110 determines whether the detected road signage is a pavement marking or a road sign. If the road signage is a pavement marking, the lane-type module 110 assigns belief masses 806 accordingly. For example, the lane-type module 110 can assign a high belief mass value for $L_t$, $L_d$, and $\{L_d, L_t\}$ and a low belief mass value for $L_s$. Alternatively, the lane-type module 110 can assign the belief masses 806 based on the determined marking (e.g., a high mass value for $L_d$ based on a right-turn marking).

If the road signage is a road sign, the lane-type module 110 assigns belief masses 808 accordingly. For example, the lane-type module 110 can assign a high belief mass value $L_d$ and $\{L_t, L_d\}$ and a low belief mass value for $L_e$, if an exit sign is detected above the lane. As another example, the lane-type module 110 can assign a high belief mass value $L_t$ and a low belief mass value for $L_d$ or $L_s$ if a through-lane sign is detected above the lane. As yet another example, lane-type module 110 can assign a high belief mass value $L_e$ if a construction sign is detected. Because the detection accuracy of a road marker is different than that of a road sign, the lane-type module 110 can use different discount factors in assigning the belief masses values.

Based on these example rules illustrated in flowchart 800, the lane-type module 110 can determine a belief mass value corresponding to specific observations. The lane-type module 110 can implement other rules based on other flowcharts, decision trees, or look-up tables. Examples of the values for the belief masses 806 and 808 assigned by the lane-type module 110 are provided in Table 4 below.

TABLE 4

|  | Pavement Marking | | Road Sign | |
| --- | --- | --- | --- | --- |
|  | Right Turn/Exit | Go Forward | Right Turn/Exit | Go Forward |
| $(L_t)$, | {0.25}, | {0.54}, | {0.25}, | {0.54}, |
| $(L_d)$, | {0.54}, | {0.25}, | {0.54}, | {0.25}, |
| $(L_s)$ | {0.01} | {0.01} | {0.01} | {0.01} |
| $(L_t, L_d)$ | {0.2} | {0.2} | {0.2} | {0.2} |

Figure 9:
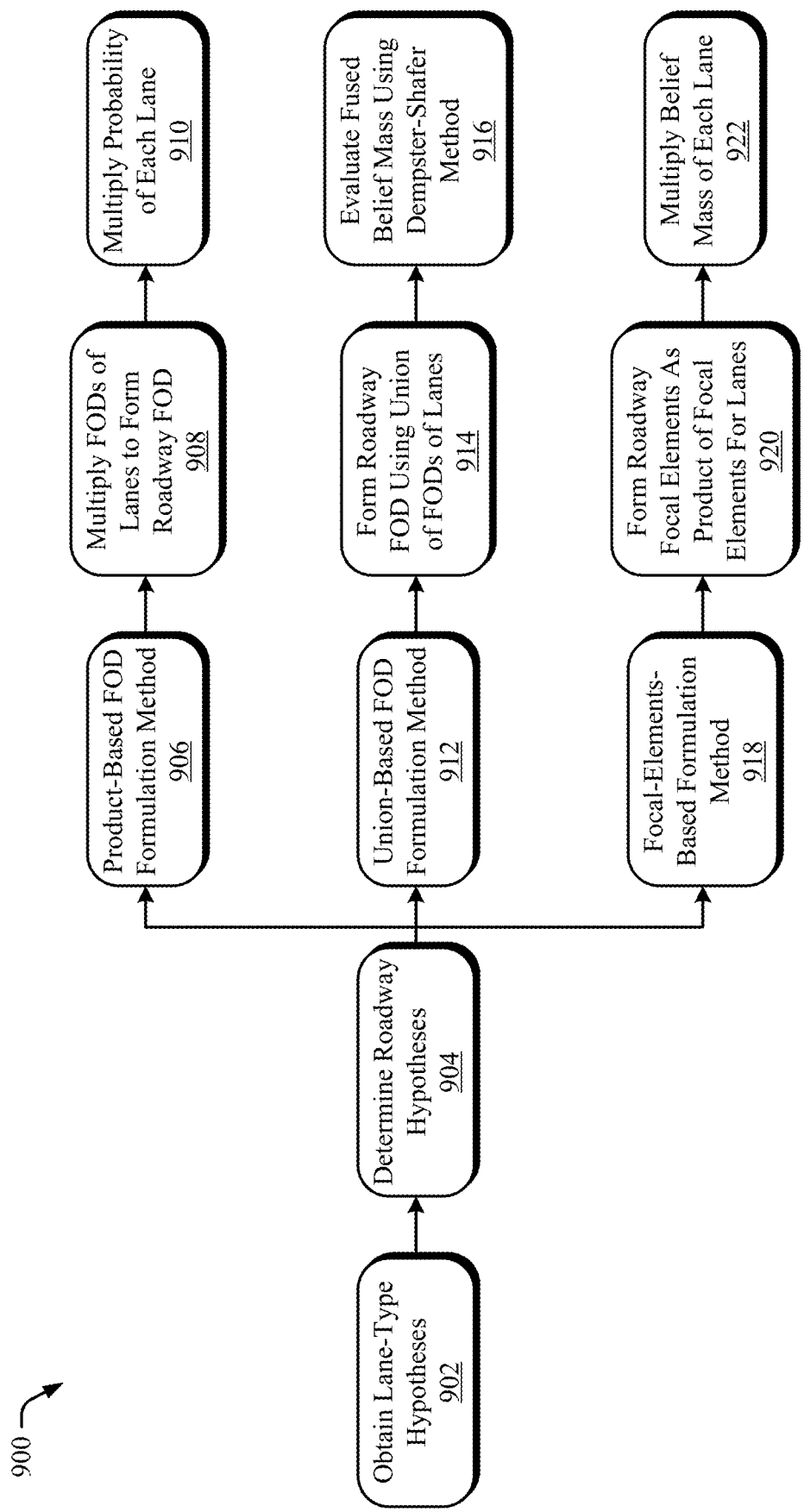
FIG. 9 illustrates an example flowchart of a roadway-type module to generate roadway hypotheses in a road model.

FIG. 9 illustrates an example flowchart 900 of the roadway-type module 112 to generate roadway hypotheses in a road model. The flowchart 900 illustrates example operations of the roadway-type module 112 of FIG. 1.

At 902, the roadway-type module 112 obtains lane-type hypotheses from the lane-type module 110. The roadway-type module 112 can assume that the lane segments and lanes are independent.

At 904, the roadway-type module 112 can determine, using the lane-type hypotheses, one or more roadway hypotheses for the two or more lanes of the roadway 120. The roadway-type module 112 can use one of several methods to determine the roadway hypotheses. Similarly, the roadway-type module 112 can use one of the several methods to evaluate the respective uncertainty of the lane-type hypotheses to determine a respective uncertainty associated with each of the roadway hypotheses.

Consider that the roadway 120 includes lane segment A and lane segment B. As an example, the roadway-type module 112 can use a product-based FOD formulation, a union-based FOD formulation, or a focal-elements-based formulation to generate the road hypotheses.

At 906, the roadway-type module 112 uses the product-based FOD formulation method. At 908, the roadway-type module 112 defines the roadway FOD as the product of FODs from different lanes together. At 910, for each combined roadway hypothesis, the belief mass value is calculated via the product of the probability of each lane segment.

Consider the example of lane segment A and lane segment B. The FOD for lane segments A and B are given by $\{L_d, L_s, L_t\}$ and $\{L_d, L_t\}$, respectively. For the lane segments A and B, the roadway-type module 112 can define the roadway FOD as:

$$\{(L_d, L_d), (L_s, L_d), (L_d, L_t), (L_t, L_d), (L_s, L_t), (L_t, L_t)\} \quad (10)$$

The roadway-type module 112 then assigns a belief mass value to each hypothesis corresponding to the joint FOD. In this example, the roadway-type module 112 can identify 64 hypotheses (e.g., the hypothesis $((L_d, L_d), (L_d, L_s))$). To calculate the belief parameter and plausibility parameter corresponding to each roadway hypothesis, the roadway-type module 112 uses the probability obtained via a pignistic transformation for both lane segment A and lane segment B. For example, the roadway-type module 112 can use the following probabilities: $p_A(L_d)$, $p_A(L_s)$, $p_A(L_t)$, $p_B(L_d)$, $p_B(L_t)$. The belief mass value for the hypothesis corresponding to new FOD is obtained by the product rule:

$$m((L_d, L_t)) = p_A(L_d) \times p_B(L_t) \quad (11)$$

The product-based FOD formulation method allows the roadway-type module 112 to directly use probabilities for decision making, which allows it to handle various ambiguous cases. The number of roadway FODs generated by this method, however, can be relatively large, and part of the ambiguity information of each lane can be discarded.

At 912, the roadway-type module 112 uses the union-based FOD formulation method. At 914, the roadway-type module 112 defines the roadway FOD using the union of FODs from different lane segments. At 916, the fused belief mass value for each road hypothesis can be evaluated using the Dempster-Shafer Theory.

Consider the example of lane segment A and lane segment B. The FOD for lane segments A and B are given by $\{L_d, L_s, L_t\}$ and $\{L_d, L_t\}$, respectively. For the lane segments A and B, the roadway-type module 112 can define the roadway FOD as:

$$\{L_d, L_s, L_t\} \cup \{L_d, L_t\} = \{L_d, L_s, L_t\} \quad (12)$$

The roadway-type module 112 then assigns a belief mass value to each roadway hypothesis corresponding to the roadway FOD. The roadway-type module 112 first expands the belief mass value of each lane segment to the roadway. The roadway-type module 112 can determine the belief mass value for the roadway 120, which includes lane segments A and B, with expansion from the belief mass value of lane segment B, $\tilde{m}_B$:

$$\tilde{m}_B(L_d) = m_B(L_d) p_A(L_d) \quad (13)$$

$$\tilde{m}_B(L_t) = m_B(L_t) p_A(L_t) \quad (14)$$

$$\tilde{m}_B(L_d, L_t) = \quad (15)$$
$$m_B(L_t, L_d) + \frac{1}{n-1} m_B(L_d)(1 - p_A(L_d)) + \frac{1}{n-1} m_B(L_t)(1 - p_A(L_t))$$

where $p_A$ denotes the probability obtained by the pignistic transformation using the information of A, n is the number of elements in the unionized roadway FOD, and the coefficient 1/n−1 is designed to distribute the reduced uncertainty given by Equations (13) and (14) equally to the hypothesis $(L_d, L_t)$ in which the single-element hypothesis was involved.

Similarly, the roadway-type module 112 can perform an expansion from the belief mass value of lane segment A, $\tilde{m}_A$. The belief mass value for the new FOD can be calculated using Dempster-Shafer fusion rule:

$$m_{BA} = \tilde{m}_A \oplus \tilde{m}_B \quad (16)$$

The union-based FOD formulation method generates a relatively small number of roadway FODs. In addition, the union-based FOD allows the roadway-type module 112 to ignore part of the ambiguity associated with the lane-type hypotheses but keeps some parts of the ambiguity of different lane segments. This method, however, can be computationally expensive because, in part, the roadway-type module 112 calculates the probabilities for decision making. In addition, a small part of the ambiguity information of each lane segment is discarded.

At 918, the roadway-type module uses the focal-elements-based FOD formulation method. At 920, the roadway-type module 112 identifies focal elements for different lane segments. The roadway-type module 112 then defines the roadway focal elements by the product of focal elements of the different lane segments. At 922, for each element in the roadway focal elements, the roadway-type module 112 determines the belief mass value via the product of the belief mass value of each lane segment.

Consider the example of lane segment A and lane segment B. The focal elements for lane segments A and B are given by $\{L_d, L_s, L_t, (L_t, L_d)\}$ and $\{L_d, L_t, (L_t, L_d)\}$, respectively. For the lane segments A and B, the roadway-type module 112 can generate twelve roadway hypotheses, including lane segments A and B, using the product rule:

$$\{(L_d, L_d), (L_d, L_s), (L_d, L_t), (L_d, (L_t, L_d)), (L_t, L_d),\\ (L_t, L_s), (L_t, L_t), \ldots\}$$

For each roadway hypothesis, the roadway-type module 112 can use the product rule to assign belief mass values. For example, the roadway-type module 112 can calculate the belief mass value of the hypothesis $(L_d, L_t)$ as:

$$m((L_d, L_t)) = m_A(L_d) m_B(L_t) \quad (17)$$

The focal-elements-based FOD formulation method does not discard any ambiguity information for the lane segments. This method, however, results in a relatively large number of roadway FODs that may become excessively large in some cases. This method also requires the roadway-type module 112 to calculate the probabilities for decision-making.

Depending on the current roadway conditions, the processing requirements for generating the lane-type hypotheses and roadway hypotheses, or other considerations, the roadway-type module 112 can use a particular method to generate the roadway hypotheses. In other implementations, the roadway-type module 112 can also use multiple methods to validate its results.

Example Method

Figure 10:
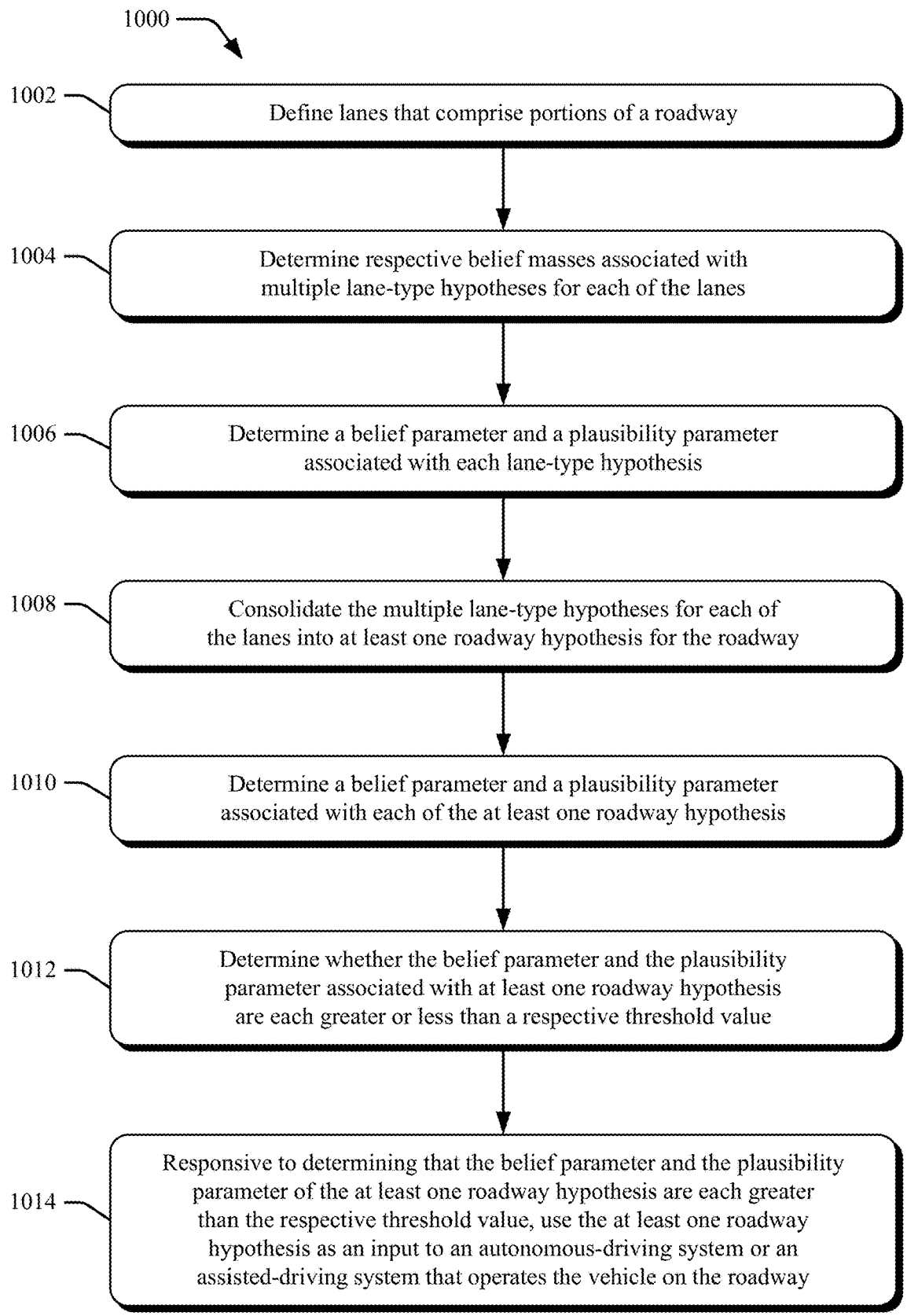
FIG. 10 illustrates an example method of a road-perception system configured to make determinations of lane-type and roadway hypotheses in a road model.

FIG. 10 depicts an example method 1000 of the road-perception system 106 to make determinations of lane-type and roadway hypotheses in a road model. Method 1000 is shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to the road-perception system 106 of FIGS. 1 through 9 and entities detailed therein, reference to which is made for example only. The techniques are not limited to performance by one entity or multiple entities.

At 1002, lanes that comprise portions of a roadway are defined. Each of the lanes has multiple lane-type hypotheses. For example, the road-perception system 106 can define lanes 122 that comprise portions of the roadway 120. The road-perception system 106 or the lane-type module 110 assigns each of the lanes 122 a potential lane-type hypothesis. The road-perception system 106 or the lane-type module 110 can define the lanes 122 using data from at least one of a map, a database, prior knowledge, or the sensors 104, including one or more vision sensors, radar sensors, or lidar sensors.

At 1004, respective belief masses associated with the multiple lane-type hypotheses for each of the lanes are determined. The respective belief masses are indicative of a confidence associated with data used to define a respective lane-type hypothesis. For example, the road-perception system 106 or the lane-type module 110 can determine the belief masses associated with the multiple lane-type hypotheses for each of the lanes 122.

At 1006, a belief parameter and a plausibility parameter associated with the multiple lane-type hypotheses for each of the lanes are determined. The belief parameter and the plausibility parameter are determined using the belief masses associated with the multiple lane-type hypotheses for each of the lanes. The belief parameter is indicative of a confidence in a lane type. The plausibility parameter is indicative of a likelihood in an existence of the lane type. For example, the road-perception system 106 or the lane-type module 110 can determine, using the belief masses associated with the lane-type hypotheses for each of the lanes 122, the belief parameter and the plausibility parameter associated with each lane-type hypothesis for each of the lanes 122.

At 1008, the multiple lane-type hypotheses for each of the lanes are consolidated into at least one roadway hypothesis for the roadway. For example, the roadway-type module 112 can consolidate the lane-type hypotheses into one or more roadway hypothesis.

At 1010, a belief parameter and a plausibility parameter associated with each of the at least one roadway hypothesis are determined. The belief parameter and the plausibility parameter are determined using the respective belief parameter and plausibility parameter associated with the multiple lane-type hypotheses for each of the lanes. For example, the road-perception system 106 can determine, using the belief parameter and plausibility parameter associated with the lane-type hypotheses, the belief parameter and the plausibility parameter associated with each roadway hypothesis.

At 1012, it is determined whether the belief parameter and the plausibility parameter associated with at least one roadway hypothesis are each greater or less than a respective threshold value. For example, the road-perception system 106 can determine whether the belief parameter and the plausibility parameter associated with the roadway hypotheses are greater or less than a respective threshold value.

At 1014, responsive to determining that the belief parameter and the plausibility parameter of the at least one roadway hypothesis are greater than the respective threshold value, an autonomous-driving system or an assisted-driving system can operate the vehicle on the roadway using the at least one roadway hypothesis as an input. For example, responsive to determining that the belief parameter and the plausibility parameter are greater than the respective threshold value, the vehicle 102 can be operated by the autonomous-driving system 118 or the assisted-driving system 116. The autonomous-driving system 118 or the assisted-driving system 116 can operate the vehicle 102 on the roadway 120 using the at least one roadway hypothesis as an input. Alternatively, the road-perception system 106, responsive to determining that at least one of the belief parameter or the plausibility parameter is less than the respective threshold value, can discontinue an operation of the vehicle with the autonomous-driving system 118 or the assisted-driving system 116 and switch the operation of the vehicle 102 to control by a driver.

EXAMPLES

In the following section, examples are provided.

Example 1: A method comprising: defining, by a road-perception system of a vehicle, lanes that comprise portions of a roadway, each of the lanes having multiple lane-type hypotheses; determining, by the road-perception system, respective belief masses associated with the multiple lane-type hypotheses for each of the lanes, the respective belief masses indicative of a confidence associated with data used to define a respective lane-type hypothesis; determining, by the road-perception system and using the respective belief masses associated with the multiple lane-type hypotheses for each of the lanes, a respective belief parameter and a plausibility parameter associated with each lane-type hypothesis, the belief parameter indicative of a confidence in a lane type for each of the lanes, the plausibility parameter indicative of a likelihood in the lane type being applicable to each of the lanes; consolidating, by the road-perception system, the multiple lane-type hypotheses for each of the lanes into at least one roadway hypothesis for the roadway; determining, by the road-perception system and using the respective belief parameter and plausibility parameter associated with the multiple lane-type hypotheses for each of the lanes, a belief parameter and a plausibility parameter associated with each of the at least one roadway hypothesis; determining whether the belief parameter and the plausibility parameter associated with at least one roadway hypothesis are each greater or less than a respective threshold value; and responsive to determining that the belief parameter and the plausibility parameter of the at least one roadway hypothesis are each greater than the respective threshold value, using the at least one roadway hypothesis as an input to an autonomous-driving system or an assisted-driving system that operates the vehicle on the roadway.

Example 2: The method of example 1, wherein the lanes are defined using data from at least one of one or more vision sensors, a map, a database, one or more radar sensors, or one or more lidar sensors.

Example 3: The method of example 2, wherein each roadway hypothesis and each lane-type hypothesis is dynamically updated based on the data.

Example 4: The method of example 1, wherein consolidating the multiple lane-type hypotheses for each of the lanes into the at least one roadway hypothesis for the roadway comprises determining a set of proposed lanes that satisfy properties of a Dempster-Shafer Theory and Dempster-Shafer fusion rule.

Example 5: The method of example 1, wherein determining the respective belief masses associated with the multiple lane-type hypotheses for each of the lanes comprises: determining whether two lane-marker boundaries are available for each of the lanes; in response to determining that the two lane-marker boundaries are not available for one of the lanes, determining, based on a type of the lane-marker boundary and a boundary position of the lane-marker boundary, the respective belief masses associated with the multiple lane-type hypotheses for the one of the lanes; and in response to determining that the two lane-marker boundaries are available for another one of the lanes, comparing a lane width of the other lane of the lanes to a lane-width threshold range: in response to determining that the lane width of the other lane is larger or smaller than the lane-width threshold range, assigning the respective belief masses associated with the multiple lane-type hypotheses for the other lane of the lanes; and in response to determining that the lane width is within the lane-width threshold range, determining, based on the type of the lane-marker boundaries and the boundary position of the lane-marker boundaries for the other lane of the lanes, the respective belief masses associated with the multiple lane-type hypotheses for the other lane of the lanes.

Example 6: The method of example 1, wherein determining the respective belief masses associated with the multiple lane-type hypotheses for each of the lanes comprises comparing a curvature of two lane-maker boundaries for each of the lanes.

Example 7: The method of example 6, wherein comparing the curvature of the two lane-marker boundaries for each of the lanes comprises: obtaining discrete lane-marker points for the two lane-marker boundaries for each of the lanes; calculating, using the discrete lane-marker points, curvature values for each of the lane-marker boundaries; compiling the curvature values for each of the lane-marker boundaries as a series of curvature values; and comparing a distance between adjacent lane-marker boundaries in the series of curvature values.

Example 8: The method of example 1, wherein determining the respective belief masses associated with the multiple lane-type hypotheses for each of the lanes comprises: determining whether trail evidence for the lanes of the roadway is available; in response to determining that the trail evidence is not available for the lanes of the roadway, determining the respective belief masses associated with the multiple lane-type hypotheses for each of the lanes; and in response to determining that the trail evidence is available for the lanes of the roadway, determining whether the trail evidence is available for a current lane in which the vehicle is traveling: in response to determining that the trail evidence is available for the current lane, determining the respective belief masses associated with the multiple lane-type hypotheses for the current lane; and in response to determining that the trail evidence is not available for the current lane, determining the respective belief masses associated with the multiple lane-type hypotheses for each of the lanes.

Example 9: The method of example 1, wherein determining the respective belief masses associated with the multiple lane-type hypotheses for each of the lanes comprises: determining whether road signage was detected; in response to determining that the road signage was detected, determining whether the road signage includes pavement marking or a road sign; in response to determining that the road signage includes the pavement marking, determining the respective belief masses associated with the multiple lane-type hypotheses for each of the lanes; and in response to determining that the road signage includes the road sign, determining the respective belief masses associated with the multiple lane-type hypotheses for each of the lanes.

Example 10: The method of example 1, wherein: consolidating the multiple lane-type hypotheses for each of the lanes into the at least one roadway hypothesis for the roadway comprises determining a product of each frame of discernment for the multiple lane-type hypotheses; and determining the belief parameter and the plausibility parameter associated with each of the at least one roadway hypothesis comprises determining a product of a respective probability for each lane-type of each of the at least one roadway hypothesis.

Example 11: The method of example 1, wherein: consolidating the multiple lane-type hypotheses for each of the lanes into the at least one roadway hypothesis for the roadway comprises determining a union of each frame of discernment for the multiple lane-type hypotheses; and determining the belief parameter and the plausibility parameter associated with each of the at least one roadway hypothesis comprises determining, using a Dempster-Shafer Theory, a fused belief mass value for each of the at least one roadway hypothesis.

Example 12: The method of example 1, wherein: consolidating the multiple lane-type hypotheses for each of the lanes into the at least one roadway hypothesis for the roadway comprises determining products of focal elements for each lane of the multiple lane-type hypotheses; and determining the belief parameter and the plausibility parameter associated with each of the at least one roadway hypothesis comprises determining a product of the respective belief mass values of each of the at least one roadway hypothesis.

Example 13: The method of example 1, the method further comprising: responsive to determining that at least one of the belief parameter or the plausibility parameter of the at least one roadway hypothesis are less than the respective threshold value results in discontinuing an operation of the vehicle with the autonomous-driving system or the assisted-driving system.

Example 14: The method of example 1, the method further comprising: responsive to determining that at least one of the belief parameter or the plausibility parameter of the at least one roadway hypothesis are less than the respective threshold value results in switching an operation of the vehicle to control by a driver.

Example 15: The method of example 1, wherein the autonomous-driving system or the assisted-driving system comprises at least one of an automatic cruise control system, a traffic-jam assist system, a lane-centering assist system, or an L3/L4 autonomous driving on highways system.

Example 16: A computer-readable storage media comprising computer-executable instructions that, when executed, cause a processor in a vehicle to: define lanes that comprise portions of a roadway, each of the lanes having multiple lane-type hypotheses; determine respective belief masses associated with the multiple lane-type hypotheses for each of the lanes, the respective belief masses indicative of a confidence associated with data used to define a respective lane-type hypothesis; determine, using the respective belief masses associated with the multiple lane-type hypotheses for each of the lanes, a respective belief parameter and a plausibility parameter associated with each lane-type hypothesis, the belief parameter indicative of a confidence in a lane type for each of the lanes, the plausibility parameter indicative of a likelihood in the lane type being applicable to each of the lanes; consolidate the multiple lane-type hypotheses for each of the lanes into at least one roadway hypothesis for the roadway; determine, using the respective belief parameter and plausibility parameter associated with the multiple lane-type hypotheses for each of the lanes, a belief parameter and a plausibility parameter associated with each of the at least one roadway hypothesis; determine whether the belief parameter and the plausibility parameter associated with at least one roadway hypothesis are each greater or less than a respective threshold value; and responsive to a determination that the belief parameter and the plausibility parameter of the at least one roadway hypothesis are each greater than the respective threshold value, use the at least one roadway hypothesis as an input to an autonomous-driving system or an assisted-driving system that operates the vehicle on the roadway.

Example 17: The computer-readable storage media of example 16, wherein the lanes are defined using data from at least one of one or more vision sensors, a map, a database, one or more radar sensors, or one or more lidar sensors.

Example 18: The computer-readable storage media of example 17, wherein each roadway hypothesis and each lane-type hypothesis is dynamically updated based on the data.

Example 19: The computer-readable storage media of example 16, wherein a determination of the respective belief masses associated with the multiple lane-type hypotheses for each of the lanes comprises a comparison of a curvature of two lane-maker boundaries for each of the lanes.

Example 20: The computer-readable storage media of claim 19, wherein the comparison of the curvature of the two lane-marker boundaries for each of the lanes comprises: obtain discrete lane-marker points for the two lane-marker boundaries for each of the lanes; calculate, using the discrete lane-marker points, curvature values for each of the lane-marker boundaries; compile the curvature values for each of the lane-marker boundaries as a series of curvature values; and compare a distance between adjacent lane-marker boundaries in the series of curvature values.

Conclusion

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:

1. A method comprising:
    defining, by a road-perception system of a vehicle and based on data from multiple information sources, lanes that comprise portions of a roadway, each of the lanes having multiple lane-type hypotheses, possible lane types of the multiple lane-type hypotheses including a through lane, a deceleration lane, a shoulder, an acceleration lane, or an ending lane, the multiple information sources including at least two of a map, a database, a vision sensor, a radar sensor, or a lidar sensor;
    determining, by the road-perception system, respective belief masses associated with the multiple lane-type hypotheses for each of the lanes, the respective belief masses indicative of a confidence associated with the data from a particular information source contributing to classifying a respective lane to a respective lane-type hypothesis;
    determining, by the road-perception system and using the respective belief masses associated with the multiple lane-type hypotheses for each of the lanes, a respective belief parameter and a plausibility parameter associated with each lane-type hypothesis, the belief parameter indicative of a confidence in a lane-type classification for each of the lanes and determined as a first sum of mass values that belong to the respective lane-type hypothesis to provide a lower bound, the plausibility parameter indicative of a likelihood of the lane-type classification being applicable to each of the lanes and determined as one minus a second sum of mass values whose intersection with the respective lane-type hypothesis is empty to provide an upper bound;
    consolidating, by the road-perception system and using one of a product-based frame-of-discernment formulation method, a union-based frame-of-discernment formulation method, or a focal-elements-based frame-of-discernment formulation method, the multiple lane-type hypotheses for each of the lanes into at least one roadway hypothesis for the roadway, each roadway hypothesis representing a unique set of lane-type hypotheses for each of the lanes in the roadway, each roadway hypothesis satisfying properties of the Dempster-Shafer Theory and Dempster-Shafer fusion rules;

determining, by the road-perception system and using the respective belief parameter and plausibility parameter associated with the multiple lane-type hypotheses for each of the lanes, a belief parameter and a plausibility parameter associated with each of the at least one roadway hypothesis;

determining whether the belief parameter and the plausibility parameter associated with at least one roadway hypothesis are each greater or less than a respective threshold value; and responsive to determining that the belief parameter and the plausibility parameter of the at least one roadway hypothesis are each greater than the respective threshold value, using the at least one roadway hypothesis as an input to an autonomous-driving system or an assisted-driving system that operates the vehicle on the roadway.

2. The method of claim 1, wherein each roadway hypothesis and each lane-type hypothesis is dynamically updated based on the data.

3. The method of claim 1, wherein determining the respective belief masses associated with the multiple lane-type hypotheses for each of the lanes comprises:

determining whether two lane-marker boundaries are available for each of the lanes;

in response to determining that the two lane-marker boundaries are not available for one of the lanes, determining, based on a type of the lane-marker boundary and a boundary position of the lane-marker boundary, the respective belief masses associated with the multiple lane-type hypotheses for the one of the lanes; and in response to determining that the two lane-marker boundaries are available for another one of the lanes, comparing a lane width of the other lane of the lanes to a lane-width threshold range:

in response to determining that the lane width of the other lane is larger or smaller than the lane-width threshold range, assigning the respective belief masses associated with the multiple lane-type hypotheses for the other lane of the lanes; and in response to determining that the lane width is within the lane-width threshold range, determining, based on the type of the lane-marker boundaries and the boundary position of the lane-marker boundaries for the other lane of the lanes, the respective belief masses associated with the multiple lane-type hypotheses for the other lane of the lanes.

4. The method of claim 1, wherein determining the respective belief masses associated with the multiple lane-type hypotheses for each of the lanes comprises comparing a curvature of two lane-maker boundaries for each of the lanes.

5. The method of claim 4, wherein comparing the curvature of the two lane-marker boundaries for each of the lanes comprises:

obtaining discrete lane-marker points for the two lane-marker boundaries for each of the lanes;

calculating, using the discrete lane-marker points, curvature values for each of the lane-marker boundaries;

compiling the curvature values for each of the lane-marker boundaries as a series of curvature values; and comparing a distance between adjacent lane-marker boundaries in the series of curvature values.

6. The method of claim 1, wherein determining the respective belief masses associated with the multiple lane-type hypotheses for each of the lanes comprises:

determining whether trail evidence for the lanes of the roadway is available;

in response to determining that the trail evidence is not available for the lanes of the roadway, determining the respective belief masses associated with the multiple lane-type hypotheses for each of the lanes; and in response to determining that the trail evidence is available for the lanes of the roadway, determining whether the trail evidence is available for a current lane in which the vehicle is traveling:

in response to determining that the trail evidence is available for the current lane, determining the respective belief masses associated with the multiple lane-type hypotheses for the current lane; and in response to determining that the trail evidence is not available for the current lane, determining the respective belief masses associated with the multiple lane-type hypotheses for each of the lanes.

7. The method of claim 1, wherein determining the respective belief masses associated with the multiple lane-type hypotheses for each of the lanes comprises:

determining whether road signage was detected;

in response to determining that the road signage was detected, determining whether the road signage includes pavement marking or a road sign;

in response to determining that the road signage includes the pavement marking, determining the respective belief masses associated with the multiple lane-type hypotheses for each of the lanes; and in response to determining that the road signage includes the road sign, determining the respective belief masses associated with the multiple lane-type hypotheses for each of the lanes.

8. The method of claim 1, wherein:

the road-perception system uses the product-based frame-of-discernment formulation method;

consolidating the multiple lane-type hypotheses for each of the lanes into the at least one roadway hypothesis for the roadway comprises determining a product of each frame of discernment for the multiple lane-type hypotheses; and determining the belief parameter and the plausibility parameter associated with each of the at least one roadway hypothesis comprises determining a product of a respective probability for each lane-type of each of the at least one roadway hypothesis.

9. The method of claim 1, wherein:

the road-perception system uses the union-based frame-of-discernment formulation method;

consolidating the multiple lane-type hypotheses for each of the lanes into the at least one roadway hypothesis for the roadway comprises determining a union of each frame of discernment for the multiple lane-type hypotheses; and determining the belief parameter and the plausibility parameter associated with each of the at least one roadway hypothesis comprises determining, using a Dempster-Shafer Theory, a fused belief mass value for each of the at least one roadway hypothesis.

10. The method of claim 1, wherein:

the road-perception system uses the focal-elements-based frame-of-discernment formulation method;

consolidating the multiple lane-type hypotheses for each of the lanes into the at least one roadway hypothesis for the roadway comprises determining products of focal elements for each lane of the multiple lane-type hypotheses; and determining the belief parameter and the plausibility parameter associated with each of the at least one roadway hypothesis comprises determining a product of the respective belief mass values of each of the at least one roadway hypothesis.

11. The method of claim 1, the method further comprising:

responsive to determining that at least one of the belief parameter or the plausibility parameter of the at least one roadway hypothesis are less than the respective threshold value results in discontinuing an operation of the vehicle with the autonomous-driving system or the assisted-driving system.

12. The method of claim 1, the method further comprising:

responsive to determining that at least one of the belief parameter or the plausibility parameter of the at least one roadway hypothesis are less than the respective threshold value results in switching an operation of the vehicle to control by a driver.

13. The method of claim 1, wherein the autonomous-driving system or the assisted-driving system comprises at least one of an automatic cruise control system, a traffic jam assist system, a lane-centering assist system, or an L3/L4 autonomous driving on highways system.

14. A computer-readable storage media comprising computer-executable instructions that, when executed, cause a processor in a vehicle to:

define, based on data from multiple information sources, lanes that comprise portions of a roadway, each of the lanes having multiple lane-type hypotheses, possible lane types of the multiple lane-type hypotheses including a through lane, a deceleration lane, a shoulder, an acceleration lane, or an ending lane, the multiple information sources including at least two of a map, a database, a vision sensor, a radar sensor, or a lidar sensor;

determine respective belief masses associated with the multiple lane-type hypotheses for each of the lanes, the respective belief masses indicative of a confidence associated with the data from a particular information source contributing to classifying a respective lane to a respective lane-type hypothesis;

determine, using the respective belief masses associated with the multiple lane-type hypotheses for each of the lanes, a respective belief parameter and a plausibility parameter associated with each lane-type hypothesis, the belief parameter indicative of a confidence in a lane-type classification for each of the lanes and determined as a first sum of mass values that belong to the respective lane-type hypothesis to provide a lower bound, the plausibility parameter indicative of a likelihood of the lane-type classification being applicable to each of the lanes and determined as one minus a second sum of mass values whose intersection with the respective lane-type hypothesis is empty to provide an upper bound;

consolidate, using one of a product-based frame-of-discernment formulation method, a union-based frame-of-discernment formulation method, or a focal-elements-based frame-of-discernment formulation method, the multiple lane-type hypotheses for each of the lanes into at least one roadway hypothesis for the roadway, each roadway hypothesis representing a unique set of lane-type hypotheses for each of the lanes in the roadway, each roadway hypothesis satisfying properties of the Dempster-Shafer Theory and Dempster-Shafer fusion rules;

determine, using the respective belief parameter and plausibility parameter associated with the multiple lane-type hypotheses for each of the lanes, a belief parameter and a plausibility parameter associated with each of the at least one roadway hypothesis;

determine whether the belief parameter and the plausibility parameter associated with at least one roadway hypothesis are each greater or less than a respective threshold value; and responsive to a determination that the belief parameter and the plausibility parameter of the at least one roadway hypothesis are each greater than the respective threshold value, use the at least one roadway hypothesis as an input to an autonomous-driving system or an assisted-driving system that operates the vehicle on the roadway.

15. The computer-readable storage media of claim 14, wherein each roadway hypothesis and each lane-type hypothesis is dynamically updated based on the data.

16. The computer-readable storage media of claim 14, wherein a determination of the respective belief masses associated with the multiple lane-type hypotheses for each of the lanes comprises a comparison of a curvature of two lane-maker boundaries for each of the lanes.

17. The computer-readable storage media of claim 16, wherein the comparison of the curvature of the two lane-marker boundaries for each of the lanes comprises:

obtain discrete lane-marker points for the two lane-marker boundaries for each of the lanes;

calculate, using the discrete lane-marker points, curvature values for each of the lane-marker boundaries;

compile the curvature values for each of the lane-marker boundaries as a series of curvature values; and compare a distance between adjacent lane-marker boundaries in the series of curvature values.

18. The computer-readable storage media of claim 14, wherein:

the processor uses the product-based frame-of-discernment formulation method;

consolidating the multiple lane-type hypotheses for each of the lanes into the at least one roadway hypothesis for the roadway comprises determining a product of each frame of discernment for the multiple lane-type hypotheses; and determining the belief parameter and the plausibility parameter associated with each of the at least one roadway hypothesis comprises determining a product of a respective probability for each lane-type of each of the at least one roadway hypothesis.

19. The computer-readable storage media of claim 14, wherein:

the road-perception system uses the union-based frame-of-discernment formulation method;

consolidating the multiple lane-type hypotheses for each of the lanes into the at least one roadway hypothesis for the roadway comprises determining a union of each frame of discernment for the multiple lane-type hypotheses; and determining the belief parameter and the plausibility parameter associated with each of the at least one roadway hypothesis comprises determining, using a Dempster-Shafer Theory, a fused belief mass value for each of the at least one roadway hypothesis.

20. The computer-readable storage media of claim 14, wherein:
the road-perception system uses the focal-elements-based frame-of-discernment formulation method;
consolidating the multiple lane-type hypotheses for each of the lanes into the at least one roadway hypothesis for the roadway comprises determining products of focal elements for each lane of the multiple lane-type hypotheses; and
determining the belief parameter and the plausibility parameter associated with each of the at least one roadway hypothesis comprises determining a product of the respective belief mass values of each of the at least one roadway hypothesis.

\* \* \* \* \*